(12) United States Patent
Baumeister et al.

(10) Patent No.: US 9,561,616 B2
(45) Date of Patent: Feb. 7, 2017

(54) TRANSPORT SYSTEM, IN PARTICULAR TRANSVERSE STRETCHING SYSTEMS

(71) Applicant: Brückner Maschinenbau GmbH & Co. KG, Siegsdorf (DE)

(72) Inventors: Michael Baumeister, Traunstein (DE); Anthimos Giapoulis, Traunstein (DE); Markus Unterreiner, Marquartstein (DE); Tobias Häusl, Traunstein (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 0 days.

(21) Appl. No.: 14/654,264

(22) PCT Filed: Nov. 28, 2013

(86) PCT No.: PCT/EP2013/003599
§ 371 (c)(1),
(2) Date: Jun. 19, 2015

(87) PCT Pub. No.: WO2014/094968
PCT Pub. Date: Jun. 26, 2014

(65) Prior Publication Data
US 2015/0328826 A1   Nov. 19, 2015

(30) Foreign Application Priority Data

Dec. 20, 2012  (DE) .................. 10 2012 025 487

(51) Int. Cl.
*B29C 55/12* (2006.01)
*B29C 55/08* (2006.01)
(Continued)

(52) U.S. Cl.
CPC .............. *B29C 55/20* (2013.01); *B29C 55/12* (2013.01); *B29C 55/08* (2013.01); *D06C 3/025* (2013.01)

(58) Field of Classification Search
CPC .......... B29C 55/20; B29C 55/12; B29C 55/08; D06C 3/025
See application file for complete search history.

(56) References Cited

U.S. PATENT DOCUMENTS 3,179,977 A * 4/1965 Nash ..................... B29C 55/08
                                                       16/87.2
3,258,866 A    7/1966 Bates
(Continued)

FOREIGN PATENT DOCUMENTS

CN      102395457       3/2012
DE      1 177 803       9/1964
(Continued)

OTHER PUBLICATIONS

U.S. Office Action issued in U.S. Appl. No. 14/654,209 dated Mar. 4, 2016. (265-364).
(Continued)

*Primary Examiner* — Alison L Hindenlang
*Assistant Examiner* — Jerzi H Moreno Hernandez
(74) *Attorney, Agent, or Firm* — Nixon & Vanderhye P.C.

(57) ABSTRACT

The invention relates to an improved transport system, in particular for a stretching system, characterized amongst other things, by the following characteristics: a support rail and/or a guide rail, over which a conveyor chain with clip chain units can be displaced, are provided, said units subdividing into a clip part and a chain part, said support rail or the guide rail or the support rail and the guide rail is/are provided with a channel which transverses in the longitudinal direction at least in one of the partial lengths of the support rail and the guide rail. The support rail running surface comprises a plurality of outlet openings through which the compressed air can be guided on the channel for generating an airbag between the support rail running surface and an air bearing cushion plate on the clip-chain unit
(Continued)

and/or the running rail running surfaces comprise a plurality of outlet openings through which the compressed air can be guided on the channel by generating an air bag between the respective guide rail running surfaces and a bearing device on the clip chain unit.

25 Claims, 14 Drawing Sheets

(51) Int. Cl.
*B29C 55/20* (2006.01)
*D06C 3/02* (2006.01)

(56) References Cited

U.S. PATENT DOCUMENTS

| | | | | |
|---|---|---|---|---|
| 3,529,332 | A * | 9/1970 | Hyatt | B29C 55/20 26/91 |
| 3,590,450 | A | 7/1971 | Pernick | |
| 3,727,273 | A | 4/1973 | Hyatt et al. | |
| 4,558,496 | A | 12/1985 | Cramer | |
| 4,882,820 | A | 11/1989 | MacKinnon et al. | |
| 4,899,427 | A * | 2/1990 | Gresens | D06C 3/02 26/92 |
| 4,926,529 | A | 5/1990 | Hosmer et al. | |
| 4,939,825 | A | 7/1990 | Kwack | |
| 5,072,493 | A | 12/1991 | Hommes et al. | |
| 5,636,454 | A * | 6/1997 | Shida | F26B 13/12 34/643 |
| 5,749,131 | A * | 5/1998 | Breil | B29C 55/165 26/89 |
| 5,797,172 | A * | 8/1998 | Hosmer | D06C 3/025 26/89 |
| 7,073,237 | B1 * | 7/2006 | Cavanagh | D06C 3/025 26/89 |
| 2005/0017123 | A1 * | 1/2005 | Meyer | B29C 47/34 242/615.12 |
| 2008/0235981 | A1 * | 10/2008 | Kato | B29C 41/26 34/427 |
| 2012/0068376 | A1 * | 3/2012 | Sano | B29C 55/08 264/291 |
| 2015/0314521 | A1 | 11/2015 | Baumeister et al. | |
| 2015/0328826 | A1 * | 11/2015 | Baumeister | B29C 55/12 425/403.1 |

FOREIGN PATENT DOCUMENTS

| | | | | |
|---|---|---|---|---|
| DE | 1 479 897 | | 9/1969 | |
| DE | 21 49 032 | | 4/1972 | |
| DE | 22 25 337 | | 12/1973 | |
| DE | 27 49 119 | | 5/1979 | |
| DE | 33 39 149 | | 5/1985 | |
| DE | 35 03 612 | | 8/1986 | |
| DE | 37 41 582 | | 6/1989 | |
| DE | 39 28 454 | | 3/1991 | |
| DE | 44 36 676 | | 4/1996 | |
| EP | 0 138 177 | | 4/1985 | |
| EP | 0 455 632 | | 11/1991 | |
| EP | 0 471 052 | | 2/1992 | |
| EP | 1 950 030 | | 7/2008 | |
| GB | 971737 | A * | 10/1964 | ............ B29C 55/08 |
| GB | 1 186 828 | | 4/1970 | |
| GB | 2178077 | A * | 2/1987 | ............ D06C 3/023 |
| JP | 07-108599 | | 4/1995 | |
| WO | 90/09055 | | 8/1990 | |

OTHER PUBLICATIONS

International Prelimina Re sort on Patentabilit issued in PCT/EP2012/005317 dated Jun. 23, 2015.
International Preliminary Report on Patentability issued in PCT/EP2013/003598 dated Jun. 23, 2015.
International Preliminary Report on Patentability issued in PCT/EP2013/003599 dated Jun. 23, 2015.
International Search Report for PCT/EP2013/003599 mailed Mar. 17, 2014, four pages.
Written Opinion of the ISA for PCT/EP2013/003599 mailed Mar. 17, 2014, five pages.
International Search Report for PCT/EP2012/005317, mailed Aug. 16, 2013, four pages.
Written Opinion for PCT/EP2012/005317, mailed Aug. 16, 2013, four pages.
International Search Report for PCT/EP2013/003598, mailed Feb. 21, 2014, four pages.
Written Opinion for PCT/EP2013/003598, mailed Feb. 21, 2014, four pages.
U.S. Appl. No. 14/654,209, filed Jun. 19 2015, in the name of Baumeister et al.
U.S. Appl. No. 14/654,222, filed Jun. 19, 2015, in the name of Eckart et al.
U.S. Office Action issued in U.S. Appl. No. 14/654,222 dated Jul 5, 2016. (265-366).
Chinese Search Report issued in App. No. 201380067278.4 dated Jun. 27, 2016.

* cited by examiner

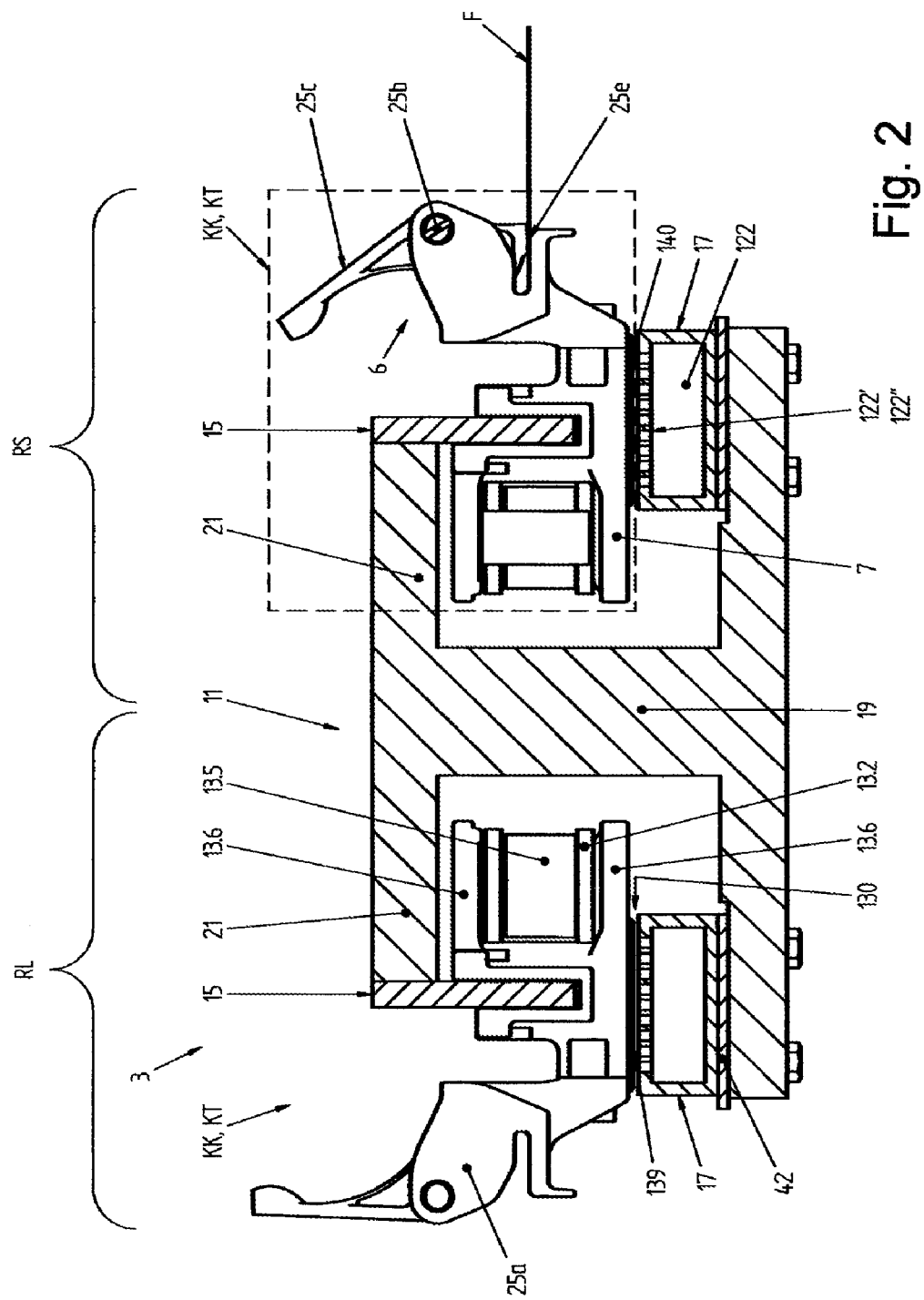

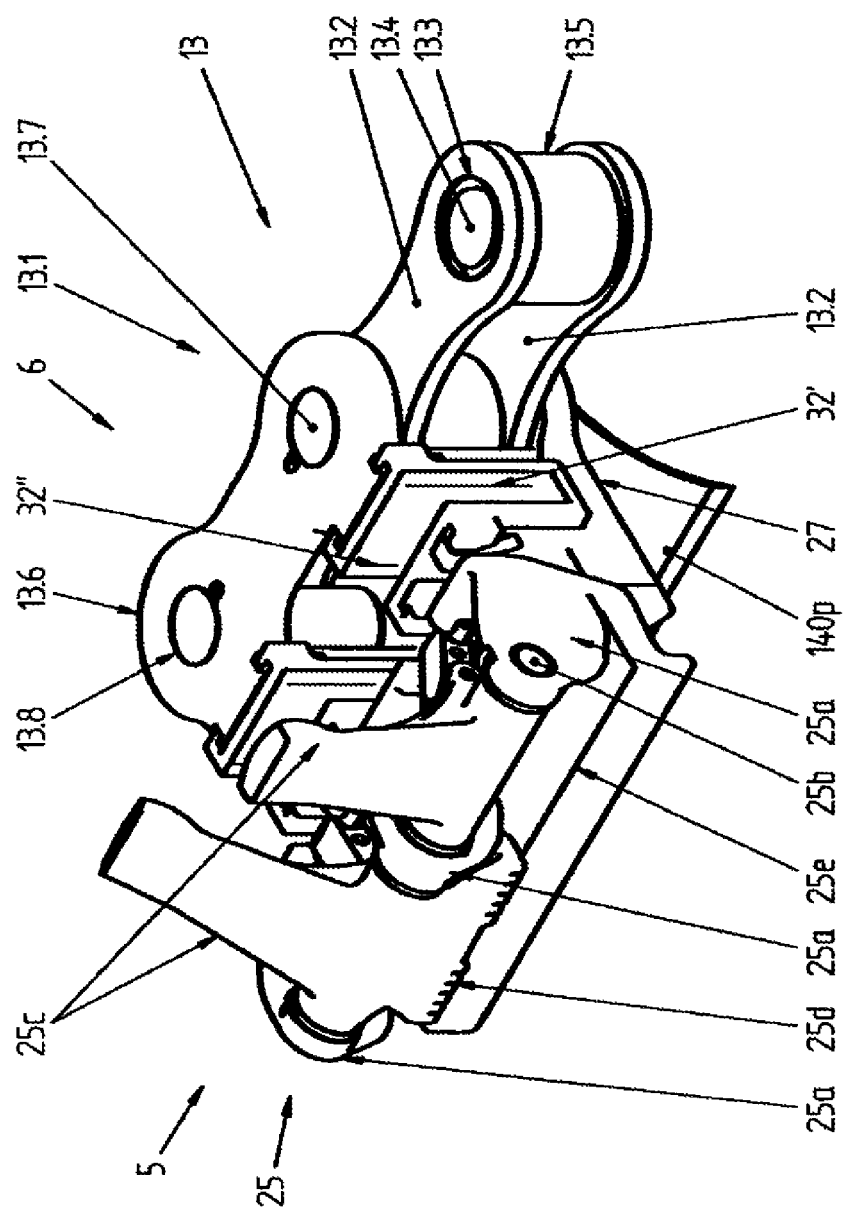

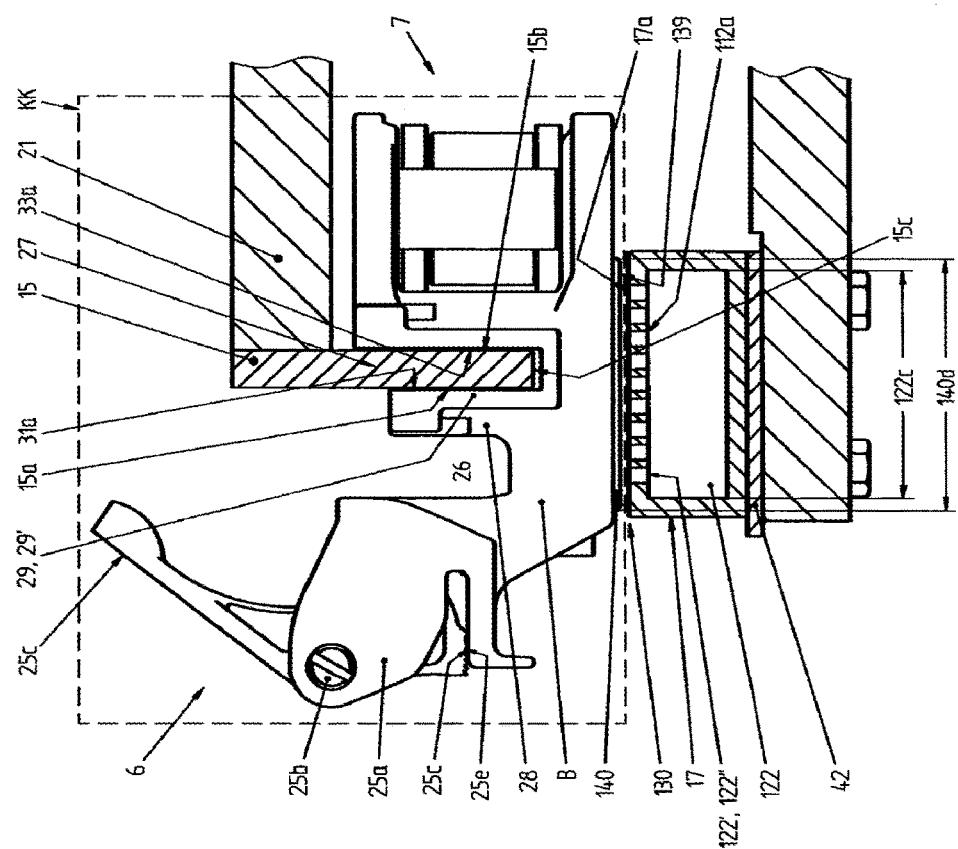

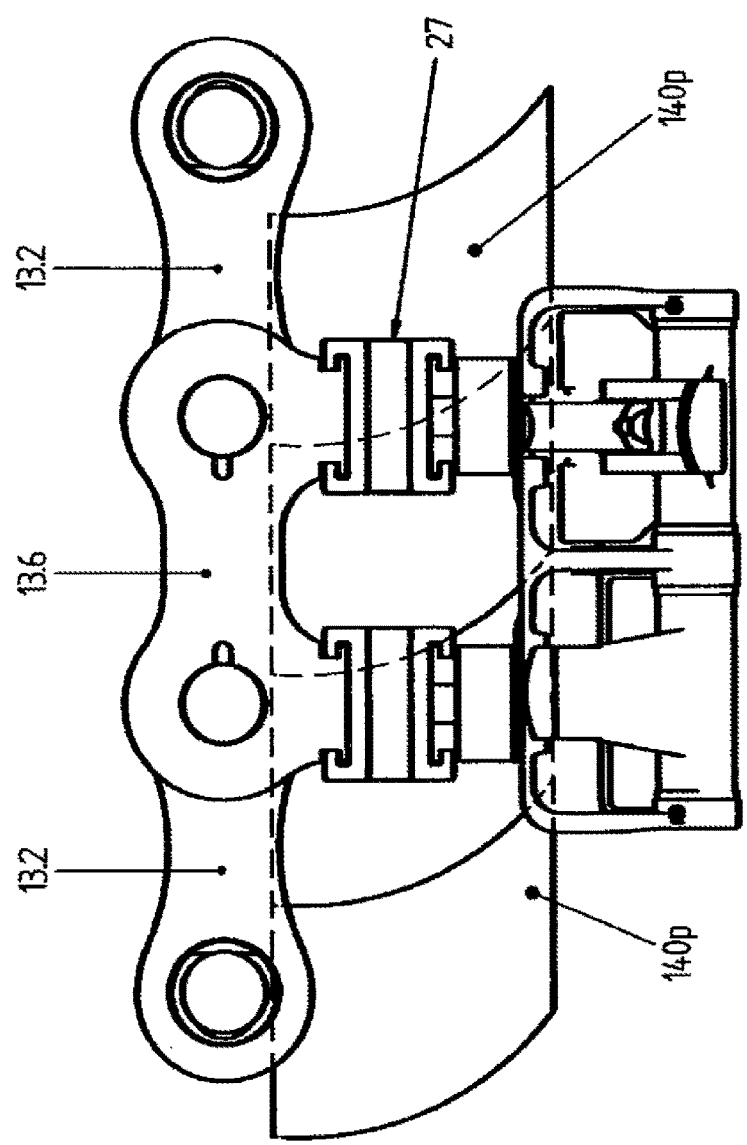

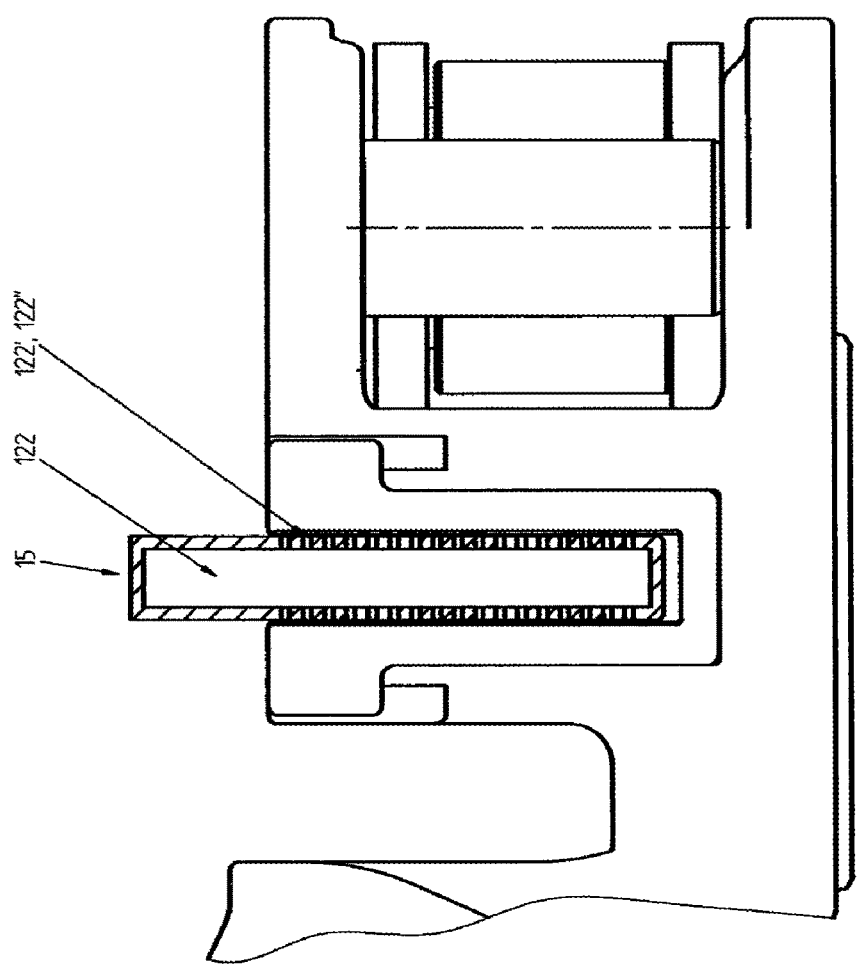

TRANSPORT SYSTEM, IN PARTICULAR TRANSVERSE STRETCHING SYSTEMS

This application is the U.S. national phase of International Application No. PCT/EP2013/003599 filed 28, Nov. 2013 which designated the U.S. and claims priority to DE Patent Application No. 2012 025 487.3 filed 20, Dec. 2012, the entire contents of each of which are hereby incorporated by reference.

FIELD OF THE DISCLOSURE

The invention relates to a transport system, in particular a stretching installation, as per the preamble of claim 1.

BACKGROUND OF THE DISCLOSURE

Stretching installations are used in particular for the production of plastics films. So-called simultaneous stretching installations are known in which a plastics film can be stretched simultaneously in a transverse direction and in a longitudinal direction. Likewise, sequential stretching installations are known in which a plastics film is stretched in two successive stages, for example firstly in a longitudinal direction and then in a transverse direction (or vice versa).

An already-known transverse stretching installation or transverse stretching stage within a stretching installation is known for example from U.S. Pat. No. 5,797,172 A. In said prior publication, a material web to be stretched, that is to say generally a plastics film, is taken hold of by way of clips, which are fastened to chains and which are arranged, on both sides of the material web to be stretched, on in each case one circulating guide path. The clips are in this case moved in succession from a run-in zone (in which the edge of, for example, a plastics film to be stretched is taken hold of) via a stretching zone (in which the opposite clips on the guide rail sections are moved away from one another with a transverse component diverging from the transport direction) to a run-out zone, and then, on a return path, back to the run-in zone, wherein, in the run-out zone, the film can undergo for example a final relaxation and/or heat treatment process.

In this case, the clips are composed of a so-called clip transport unit which comprises firstly the clip part itself and secondly the so-called transport part, that is to say the clip device and the transport device. In the already-known prior art according to U.S. Pat. No. 5,797,172 A, the so-called transport part is ultimately a chain part, as the clips for the discussed transverse stretching installation are connected to one another by way of corresponding chain links.

According to said previously published prior art, the clip transport unit is in this case supported by way of slide elements on two opposite sides of a guide rail, on the one hand, and on a support rail provided below the guide rail, on the other hand.

Instead of slide elements of said type, it is however likewise also possible to use roller elements in order to permit movement of the clip transport unit, supported for example on a guide rail and on a weight-sustaining running rail. This is known for example from DE 39 28 454 A1. Said document describes a guide rail in the form of a so-called monorail, which guide rail has a square cross section. In this case, the clip transport unit is supported by way of running wheels, so-called rollers, which roll on the top side and on the bottom side and on the two vertical sides situated offset in a horizontal direction, whereby the clip transport unit can be moved along said guide rail. A clip transport unit of said type is likewise suitable in particular for a stretching frame, that is to say a transverse stretching installation.

In the case of the already-known stretching installations, there is the basic problem of ensuring that the friction coefficients for the rolling and/or sliding friction do not become too high. This is because the acting friction makes it necessary for lubricant, in particular oil, to be used in order to reduce the friction. Here, it is pointed out that not only does the friction contribute to considerable power losses, but also the power losses arise, in particular in the case of friction bearing arrangements, in the form of friction losses, that is to say in particular the power lost is released in the form of heat to the guide system. At high speeds, it is therefore necessary for conventional slide guides to be cooled in order to prevent decomposition (cracking) of the lubricating oil.

By contrast, it is an object of the present invention to provide an improved transport system, in particular in the form of a transverse stretching installation.

The object is achieved according to the invention in accordance with the features specified in claim 1. Advantageous refinements of the invention are specified in the subclaims.

In the context of the present invention, a transport system is provided for transport chains equipped, for example, with clips and which (aside from sprockets) are movable in rail-bound fashion along a guide path. In the case of the support rails provided in this transport system, by contrast to conventional solutions, no oil lubrication is realized for the purposes of reducing the friction or sliding coefficients, and instead, here, it is provided that an air bearing in the form of an air cushion is formed.

Air bearings of said type exhibit an extremely low friction coefficient. The friction coefficient is however a crucial factor in the case of such sliding transport systems. Said friction coefficient determines inter alia the dimensioning of the chain. In the case of a low friction coefficient, the chain longitudinal force decreases, whereby the chain can be configured for lower loads. Thus, the chain weight is also reduced, whereby in turn, the chain longitudinal force is reduced. A lower friction coefficient thus also permits the formation of a more lightweight transport chain. As has already been discussed in conjunction with already-known transport systems, in particular of transverse stretching installations, the friction basically gives rise to considerable power losses. The power lost is released, through friction losses, in the form of heat to the guide system. This is the reason why, in the presence of high installation speeds, conventional slide guides must be cooled in order to prevent the abovementioned decomposition (cracking) of the lubricating oil film. In the case of the air bearing-mounted guide system provided in the context of the present invention, there is no risk of this because, firstly, large amounts of heat are not generated, and secondly, no oil is used either.

A further major advantage arises from the fact that, in the context of the present invention, it is not necessary to use oil as lubricant. This is because the oil lubrication in the case of conventional transport systems, in particular stretching installations, harbors the inherent risk of the oil film that is used leading to fouling of the film, which should and must be prevented in all situations, for which reason cumbersome structural measures are required for this purpose in conventional installations. Since, as mentioned, oil is not used in the case of air bearing-mounted systems, an oil shielding arrangement for preventing oil fouling is also not required.

The discussed reduction in power losses furthermore has a positive effect on the required drive power. This is because, in the context of the air bearing arrangement provided according to the invention, it is now also possible for use to be made of smaller drive motors.

It finally remains to be stated that conventional transport sliding systems with a conventional oil lubrication arrangement ultimately also reach their physical limits at high speeds. By contrast, very much higher installation speeds can be reached with the air bearing-mounted transport system provided according to the invention.

Air bearing technology is itself fundamentally known. However, air bearing technology is presently used primarily for measurement machines and for low-speed applications. Furthermore, such applications are normally found in clean environments.

Furthermore, the use of air bearing technology for moving extremely heavy equipment is also known, wherein conventionally, the equipment to be moved serves, itself, for generating the air cushion. In the case of such vehicles and equipment operated using air cushions, even a contaminated environment generally does not constitute a problem. However, in this case, too, it is normally the case that only low speeds are reached, and it is normally also the case that only relatively short distances are covered. Here, it is normally the case, in standard applications, that the air bearing itself is supplied with air.

Furthermore, it is basically also known for air bearing technology to be used in a circulating transport system. In this regard, reference is made to DE 2 149 032 A, in which a conveyor belt is guided on an encircling path in the form of a support body. Between the underside of the encircling conveyor belt and the support body, there is provided an air bearing which bears the conveyor belt. The air bearing is in this case supplied with compressed air through openings in that surface of the support body which lies below the conveyor belt. For this purpose, the support body has, in cross section, a rectangular shape, in the interior of which there is formed a compressed-air duct, such that the compressed air supplied here can then flow out through the openings, situated on the top, in the direction of the underside of the conveyor belt and thus bear the conveyor belt.

To keep the air consumption low, it is furthermore the case that lateral sealing lips are provided. In the case of an already-known transport system of said type, however, it is merely intended for a more or less flat transport belt to be moved along on the air cushion that is formed, that is to say an areal structure with a relatively large width extent and, in relation thereto, only a minimal height.

BRIEF SUMMARY OF THE DISCLOSURE

By contrast, the invention proposes a transport system in particular in the form of a transverse stretching installation, in which it is intended for rail-bound chain units to be mounted and guided on a support rail using the air bearing technology in question.

In a particularly preferred refinement of the invention, it is furthermore provided that the clip chain units, which are joined together to form a transport chain using chains, have a balanced overall weight distribution. This is because, in a preferred refinement of the invention, it is provided that the additional forces that act on a transport chain of said type with the clip transport units, for example acting stretching forces, transverse or lateral guidance forces, centrifugal forces etc., should lead to no, or only minimal, additional torques or tilting moments being introduced, and that, here, all of the abovementioned forces are in particular entirely or at least almost entirely decoupled from the weight forces of the transport chain. That is to say, the process-related forces mentioned in the introduction, which run perpendicular to the weight forces, are accommodated and absorbed by the lateral guide rail that is generally provided, such that the transport chain can be supported relative to the support rail by way of the provided air cushion system entirely without tilting and without torques. There would otherwise, without such measures, be the risk of said air cushion forming on one side owing to the tilting moments, which could lead to very high air consumption and in severe cases possibly even failure of the system.

In summary, therefore, the present invention thus offers the following advantages:

- In the context of the invention, high installation speeds can be attained.
- In the context of the invention, considerably improved quality of the material web to be stretched, that is to say of the plastics film to be stretched, is attained, specifically owing to reduced oil fouling, for example in the heating zones (furnace).
- Since lubricating oil is no longer required, operating costs are lowered.
- Furthermore, in the context of the invention, the required energy consumption (required drive power) is also reduced, which is not only of importance with regard to environmental policies but furthermore likewise contributes not insignificantly to a reduction in operating costs.

Furthermore, in the context of the invention, even further improvements can be realized which lead to further advantages.

Accordingly, in the context of the invention, in the case of the clip chain system, it is possible for both the clip part and the chain part (that is to say generally the transport part) to be produced entirely or partially from lightweight materials. It is particularly advantageous for the clip transport unit to be composed of lightweight materials, such as in particular composite materials, in particular fiber composite materials, in as large a fraction as possible. In particular, long-fiber fiber composite materials such as carbon fiber composite materials are particularly suitable.

The weight reduction however also has the effect that the various forces acting on the clip transport part and in particular on the clip transport chain, such as drag forces, preload forces and centrifugal forces, are reduced, all of which has proven to be an additional advantage in the context of the invention.

Finally, a further improvement may also be attained by virtue, for example, of slide bodies composed of suitable sliding materials being provided on the underside of the clip chain parts, which slide bodies can interact with correspondingly expedient sliding materials on the running surface of the support rail. This is of particular significance as a so-called "fall-back" solution if, for example, the air bearing arrangement provided according to the invention does fail. Said sliding materials however also have significance for example if particular control measures are or must be implemented in a corresponding installation, for example the run-down of the installation etc. This is because, in this case, it is by all means possible for the air flow to be shut off in regulated fashion. However, even in the event of a stoppage of an air flow, it is then possible for the corresponding parts to slide on one another, such that no fundamental damage can occur to the installation.

The discussed air cushion bearing, according to the invention, of the clip transport unit with respect to the support rail may likewise also be realized in the case of an additional guide rail being provided. The statements made are in this respect equally intended to additionally or alternatively apply also to a guide rail.

BRIEF DESCRIPTION OF THE DRAWINGS

The invention will be discussed in more detail below on the basis of exemplary embodiments. In this case, in detail:

FIG. 2 is a schematic cross-sectional illustration through a beam structure for the guide path of a transport chain with associated clips;

FIG. 3 shows a clip with parts of the transport chain in a three-dimensional detail illustration;

FIG. 4a shows a clip according to the invention in a side view parallel to the feed movement of the clip (for unique designation of the directions, a coordinate system has been plotted, wherein m denotes the transport direction along the guide rail, t denotes the direction of the vector normal thereto and z denotes the direction collinearly with respect to the guide rail);

FIG. 4b shows a corresponding plan view of the exemplary embodiment as per FIG. 4a;

FIG. 11 shows, in a detail illustration, a cross section through the guide rail which is formed with an integrated compressed-air duct for generating air cushions in the region of the guide rail.

DETAILED DESCRIPTION

A transport system of a stretching installation is generally composed of a weight-sustaining running rail and of a guide rail, which may however also be combined in one rail unit.

The invention will be discussed below on the basis of a widthwise stretching installation, that is to say a transverse stretching installation (such as can be used for example in a sequential stretching installation).

Basic Construction

Figure 1A:
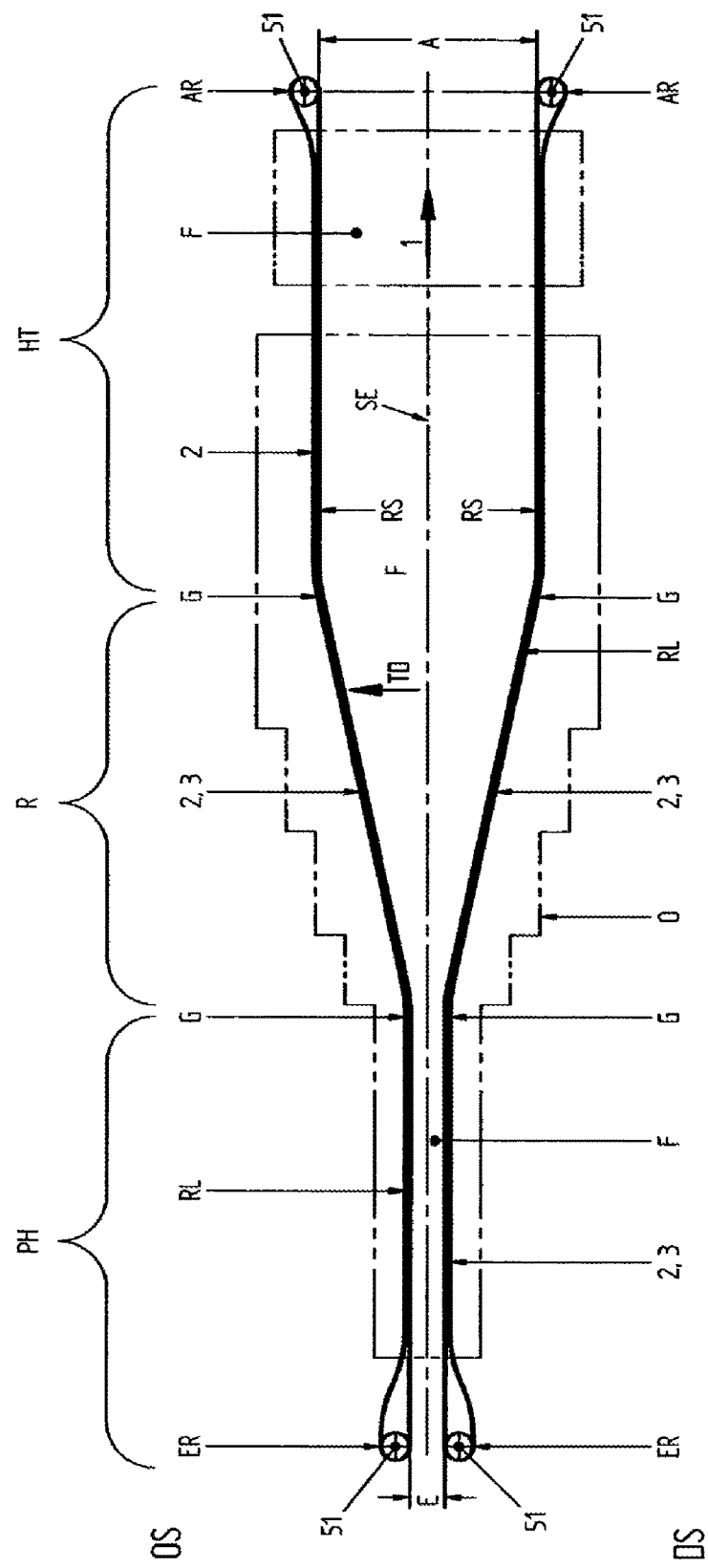
FIG. 1a shows a schematic plan view of a transverse stretching installation with a common beam structure for the process side and the return side within the furnace.

The described widthwise or transverse film stretching installation, which will hereinafter also be referred to for short as TD stretching installation (TD=Transverse Direction), has two drive systems of symmetrical form, as is known. FIG. 1a shows the two drive systems, which run vertically with respect to the plane of the drawing and are arranged symmetrically with respect to the plane of symmetry SE, wherein, between the two drive systems which circulate on closed paths 2, the material web to be treated, that is to say stretched, said material web being in particular in the form of a plastics film F, is moved through along the drawing-off direction 1 (that is to say in the machine direction MD). The discussed TD stretching installation may in this case also be part of a sequential stretching installation, which conventionally comprises a longitudinal stretching stage positioned upstream of the transverse stretching installation (transverse stretching frame) (in case of doubt, said longitudinal stretching stage may however also be positioned downstream of the transverse stretching stage). The stretching installation shown in FIG. 1a comprises two chain transport systems 3 which are driven in the direction of circulation on the two encircling paths 2.

A biaxial (that is to say if a longitudinal stretching installation is positioned upstream of the transverse stretching installation shown) or unstretched film F (wherein, below, a film will be referred to even though a stretching installation of said type can generally be used for the corresponding treatment and transverse stretching of a web for treatment F, such that the invention is in this respect not restricted to a plastics film web) runs into the stretching installation in the run-in region E and, there, is taken hold of and clamped at both edges 8 by clips (to be discussed in more detail below, and shown for example in FIG. 2), specifically on the so-called operator side (OS) and on the drive side (DS). The film F is then heated in a subsequent preheating zone PH and subsequently supplied to a stretching zone R in order, there, to be stretched in the transverse direction TD. Subsequently, the stretched film F runs through various heat treatment zones HT, in which a relaxation of the film can also take place. At the end of the stretching installation, in the so-called run-out zone A, the film is disengaged from the clips by suitable means and then exits the transverse stretching machine, that is to say the transverse stretching installation TD.

Below, a clip transport unit KT will also be referred to, which will hereinafter in part also be designated as clip chain unit KK. Said clip transport unit KT or clip chain unit KK comprises, firstly, the so-called clip part 6, which is connected to the chain or transport part 7. In the example discussed, in which a transport chain is used, reference is preferably made to a chain part 7, which is part of the clip chain unit KK.

As is known, said clip chain units KK, that is to say the mentioned clip part 6 and the chain part 7, are situated in a circulating transport system 3 which comprises firstly a beam structure 11, and a circulating transport chain 13, on which the mentioned clip parts 6 are fastened or formed so as to run together therewith. The beam structure 11 comprises a guide rail 15. In addition to said guide rail 15 there is also provided a support rail 17 which bears the weight of the chain and of the clips and which, below, will also in part be referred to as weight-sustaining running rail 17. As also emerges from the following explanation, the transport chain with the clips that can move concomitantly thereon are guided and supported on the guide rail 15 (for example by way of a slide bearing arrangement or else by way of an air cushion bearing arrangement) and on the support rail 17 by way of an air cushion bearing arrangement.

The discussed support structure may be used as a common support structure for the transport system both on the stretching or process side RS and on the return side RL (FIG. 2).

Figure 1B:
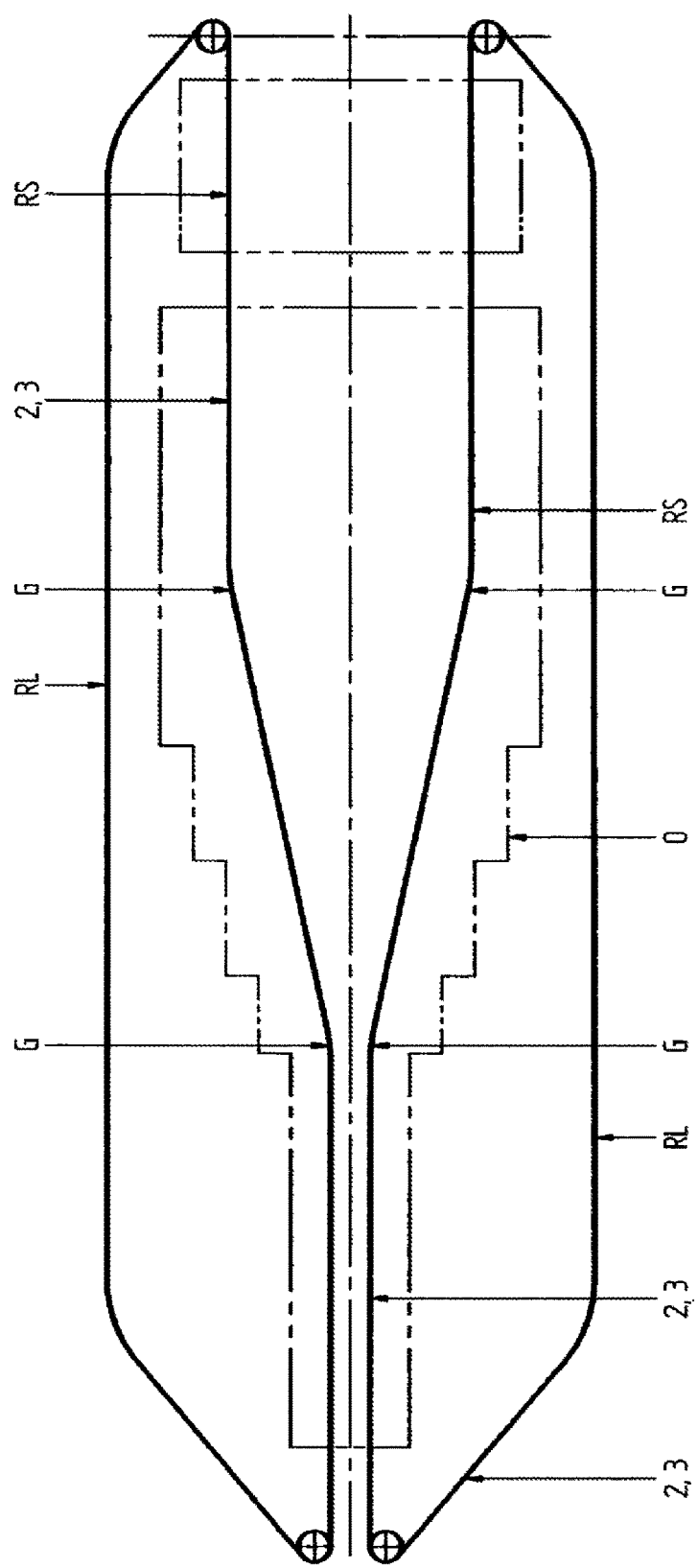
FIG. 1b shows an embodiment, modified in relation to FIG. 1a, of a return side for the transport chain which is separate from the process side and outside the furnace.

FIG. 2 shows a cross section through the transport system, specifically with a common support structure 11 which, aside from a centrally arranged, rather vertically running member 19, comprises a transverse member 21 which is supported by said vertically running member and on each of the opposite ends, pointing away from one another, of which the rail 15, which runs from the top downward and which is of rectangular cross section, is mounted, this specifically being provided on the stretching side RS, on the one hand, and on the return side RL, on the other hand, as mentioned. In the case of a common support arrangement of said type, the transport system is situated jointly within a furnace O (FIG. 1a). Said furnace surrounds the preheating zone PH, the stretching zone R and the post-heating zone or relaxation zone HT, such that ultimately only the diverting and drive systems provided on the inlet side and outlet side are situated outside the furnace O. Otherwise, it is also possible for a separate beam structure to be provided for the stretching side RS and the return side RL, such that in this case, only the stretching-side beam structure with the associated guide rail and the weight-sustaining running rail runs through the furnace O, and a correspondingly designed further beam structure is provided on the return side outside the furnace O. A corresponding design is shown in a schematic plan view in FIG. 1b.

As mentioned, the transport chain 13 is driven and diverted both on the run-out side and on the run-in side by way of run-out and/or run-in wheels AR and ER.

To make the system flexible, it is furthermore the case that joints G for the guide rail and the support rail are provided at various locations; this will be discussed in more detail further below. Through different setting of said joints, it is possible in particular to set different transverse stretching conditions in the stretching zone R.

Design of the Transport System, in Particular of the Transport Chain, and of the Associated Clip Bodies and of the Air Cushion System Below, the basic design of the transport chain 13 with the chain parts 7 and the associated clip parts 6 (with the clip bodies thereof), and of the beam structure, will be discussed in more detail on the basis of FIGS. 3 to 5.

Here, FIG. 3 shows a detail of the transport chain 13, wherein, as is known, the transport chain comprises in each case chain links 13.1 which are articulatedly connected to one another. As is known, a chain of said type, a so-called roller chain, comprises in each case one pair of inner link plates 13.2 (FIG. 3) which are arranged parallel to one another with an axial spacing and which each have two bores 13.3, in the axial elongation of which, between the two link plates, there is arranged a sleeve 13.4, by means of which the two inner link plates 13.2 are fixedly connected to one another. Onto said inner sleeve 13.4 there is mounted an outer sleeve 13.5, referred to as protective roller, which can rotate freely on the sleeve 13.4 situated under it.

Arranged in each case to the outside of the inner link plates 13.2, and so as to be linked thereto, are so-called outer link plates 13.6, such that ultimately, the pair of inner link plates 13.2 is connected to two adjacent outer link plates, that is to say a pair of leading and a pair of trailing outer link plates 13.6. For this purpose, in each case one pin 31.7 extends through the corresponding bore 13.8 in the outer link plate 13.6 and, in so doing, projects through the corresponding bore 13.7 of the inner link plate and the inner sleeve 13.4. By means of said pin 13.7, the respective pair of outer link plate 13.6 are in each case likewise fixedly connected to one another.

In this case, in the exemplary embodiment shown, the outer link plates 13.6 are in each case part of the chain parts 7. In this case, said outer link plates may nevertheless be integrally connected to or fastened to the clip part 6.

The transport chain 13 thus formed comprises a clip mechanism or section 25 with a clip bracket 25a, which is for example composed of, or comprises, two clip cheeks situated offset in a horizontal direction. Between these there runs a horizontal clip spindle (so-called blade flap) 25b by means of which the corresponding clip lever 25c is then pivotable in a known manner between a released position and a film fixing position, in which its gripping surface (fixing section) 25d, situated at the bottom, can fix, that is to say clamp and firmly hold, a film between the gripping surface 25d and the clip table 25e.

The entire arrangement (as can be seen in particular from FIG. 4a in a side view and in FIG. 4b in a plan view of a clip body with associated chain links) is such that, between the clip part 6 (that is to say the chain section KE itself) and the chain part 7 (that is to say the clip section KE itself), there is provided a U-shaped recess 26, forming a bridge part B (whereby the clip part is connected to the chain part), wherein said U-shaped recess 26 is adjoined by a vertically upwardly projecting material web 28, which in turn is followed by a further U-shaped recess 27 in the chain part 7, into which recess there is inserted a corresponding guide rail slide bearing arrangement 29, which will hereinafter in part also be referred to as slide shoe 29a. The two mentioned U-shaped recesses 26, 27 and the rib-like material web 28 which is situated in between and which extends vertically over a part of the height are all formed so as to run in the axial longitudinal direction of the clip chain unit KK.

Said guide rail slide bearing arrangement 29 comprises a slide body or slide shoe 29a which is U-shaped in cross section and which has a corresponding width or length in the direction of the guide rail 15, in order, here, to accommodate the corresponding guide forces. For this purpose, the guide rail slide bearing arrangement 29 has a chain force-sustaining slide element or chain force-sustaining slide arrangement 31 which is situated at the clip side and which has a chain force-sustaining running surface 31a, hereinafter also referred to as chain force-sustaining slide surface 31a. Situated opposite the latter is a second running and/or slide surface 33a on a stretching force-sustaining slide element or on a stretching force-sustaining slide arrangement 33, hereinafter also referred to in part as stretching force-sustaining running surface 33a or stretching force-sustaining slide surface 33a. The slide surfaces may also be integral constituent parts of the clip chain unit KK.

On the underside of the clip body 6 there are formed or provided one or more air bearing cushion plates 140 whereby the clip chain units KK (that is to say the respective clip parts 6 with the chain parts 7 connected thereto) with the corresponding weight are supported, with the interposition of an air cushion 130 to be explained in more detail further below, with respect to the support and/or running rail 17 (FIG. 2). The underside of said air bearing cushion plates 140 will hereinafter in part also be referred to as cushion plate support surface 139.

From the illustrations in FIGS. 3, 4a and 4b, it also emerges that, in the case of the discussed clip structure, two clip levers 25c, also referred to in part as blade flaps 25c, are arranged on the clip body 6, specifically so as to be situated offset with respect to one another in the longitudinal direction of the transport chain. Said clip levers may in this case be arranged pivotably on a common clip spindle 25b, wherein the two clip levers or blade flaps 25c can be moved separately from one another between their open and closed positions. This, too, yields a reduction in overall weight and overall costs. Systems with only one blade flap, or with more than two blade flaps, are self-evidently also possible.

Finally, a minimization of weight and costs is also realized by virtue of the fact that, in the exemplary embodiment shown, for the transport chain 13, a chain pitch of for example around 75 mm is realized, that is to say a chain pitch of preferably greater than 60 mm and less than 90 mm, in particular greater than 65 mm and less than 85 mm, preferably between 70 mm and 80 mm. However, any pitch is basically conceivable for the claimed system.

The discussed clip body 6 is, by way of the chain part 7 fixedly connected thereto and forming part of the transport chain 13, moved along on the support structure 11, already discussed on the basis of FIG. 2, both on the process or stretching side RS and on the return side RL (wherein FIG. 2 shows an embodiment corresponding to FIG. 1a; otherwise the feed and return and thus the support structure for the guide rail would be separate on the feed side and on the return side). From this illustration, it can also be seen how a respective clip chain unit KE is guided by way of its slide bearing 29, which is U-shaped in cross section, by virtue of the corresponding two oppositely situated slide bearing surfaces bearing against, and thus being guided by, the opposite outer surfaces 15a, 15b of the guide rail 15, which is designed as a guide rail, during the forward movement of the transport chain.

The support rail 17 is in the form of a support rail through which gas flows, and which thus has, in the interior, a flow duct 122 through which there flows a gaseous medium, in particular air.

On the support rail running surface 17a itself, it is then possible for a multiplicity of gas outlet openings, in particular air openings 122', to be formed in the upper wall of the duct 122, through which openings pressurized gas or air can flow out and flows directly against the underside of the clip chain unit KK, wherein said underside of the clip chain unit KK is generally referred to as bearing device 139, and specifically as cushion plate support surface 139. In this way, an air cushion 130 is formed, whereby it is ensured that the corresponding clip chain units, and thus the transport chain as a whole, are borne and guided by means of an air cushion 130.

Said gas or air duct 122 thus has, at its top side, a duct wall 122a in which the corresponding air outlet opening 122' is formed, that is to say said top support wall is preferably equipped with a perforation 122" in order to allow air or gas to emerge in as far as possible a uniformly distributed manner over the full area. The corresponding air outlet openings 122' are therefore preferably composed of finely distributed bores, wherein said finely distributed bores may preferably be composed of an open-pored metal foam structure through which the compressed air flows out.

This yields an extremely low friction coefficient and thus low friction losses. In this way, it is also possible to realize particularly high installation speeds, because air or a gaseous medium cannot crack, by contrast to oil. Finally, based on this principle, it is also possible to realize particularly easy transportation, because very low chain longitudinal forces also arise owing to the low friction coefficient. Furthermore, the risk of contamination of the material web to be stretched, in particular of the plastics film to be stretched, with oil particles and oil spray that are/is otherwise possibly flung in the direction of the plastics film is once again reduced.

Here, the design of the transport system discussed on the basis of FIGS. 2 to 4a is basically similar to the prior art, in which, instead of the mentioned bearing device/cushion plate support surface 139, use is made of a conventional weight-sustaining running surface on the underside of a slide element, which is lubricated with respect to the support rail running surface 17a by means of oil lubrication.

Instead of a conventional sliding surface shoe, use is thus made of so-called air bearing cushion plates 140. The mentioned stretching or transverse forces, centrifugal forces etc., which thus act perpendicular to the weight forces, collectively act only on the guide rail 15, which thus does not, or need not, undergo any further change.

The mentioned air bearing cushion plate 140 may in this case be composed of any suitable material. For example, it is possible—although in this case there is no sliding action with the support rail 17 owing to the air cushion 130—to nevertheless use materials such as could basically also be used as sliding materials. These may for example be materials such as polyether ether ketone, carbon, graphite materials etc. The background to this is that there should be a correspondingly good sliding action between the support or slide surface 139 of the air bearing cushion plate 140 and the top side 17a of the support and running rail 17. This is because, in the event of failure of a compressed-air supply, the clip chain unit KK must then slide on the support and running surface 17a of the support rail 17, albeit without optimum sliding friction coefficients, at least until the installation comes to a standstill. Therefore, preferably slide shoe materials composed for example of PEAK/PEEK or of novel graphite-based sliding materials are preferred.

For the mentioned slide elements, use is thus made of plastics which may for example be composed of or comprise thermoplastics or thermosets. In this case, the thermoplastics or thermosets may be composed of the following, or comprise the following constituents:

fibers of all types for reinforcement (fraction from 0% to 100%), for example in the form of carbon fibers, glass fibers etc., solid lubricants of all types (fraction from 0% to 100%), for example in the form of graphite, molybdenum sulfide etc., coatings of all types, for example plastics, metals etc., surface treatments of all types, for example with gases, radiation, thermal, electrical, etc., mechanical surface treatments, for example by turning, milling etc.

In this case, the abovementioned slide elements may also be composed of or comprise combinations of thermoplastics and thermosets, also taking into consideration the abovementioned supplementary explanations and supplementations, that is to say also additionally taking into consideration further abovementioned combinations or materials.

The slide elements 31, 33 of the slide bearing arrangement 29 for the guide rail 15 may be formed in the same way.

By contrast to a conventional air bearing, it is, as described, the case in the context of the exemplary embodiment discussed according to the invention that the compressed air flows out of the guide and not out of the bearing itself. The advantage in this arrangement lies in the fact that there is no need for a compressed-air supply to be attached to or provided on the moving chain. Small air outlet openings 122' are formed continuously in the weight-sustaining running surface 17a situated on the top of the support or weight-sustaining rail 17. Said openings should be as small as possible. Here, expedient hole cross sections are for example smaller than 1 mm, 0.9 mm, 0.8 mm, 0.7 mm, 0.6 mm, 0.5 mm, 0.4 mm, 0.3 mm, 0.2 mm, and in particular smaller than 0.1 mm. It is likewise possible to use a support rail with a weight-sustaining running surface 17*a* which lies on the top and which comprises a porous guide material (similar to sintered material). The compressed air can then flow out of said microscopically small openings in an upward direction. In this case, the slide bearing material of the air bearing cushion plate 140 should exhibit extremely good emergency running properties.

Owing to the abovementioned reduction of the mass of the clip transport units KT, it is furthermore the case in particular that the energy required for operating an installation of said type is further reduced. Even upon stoppage of the generation of the mentioned air cushions (for example during the start-up or run-down of the installation), when contact occurs between the air bearing cushion plates 140 and the running surfaces 17*a* of the support rail 17, which air bearing cushion plates and running surfaces are preferably composed of sliding materials, the forces acting here are likewise minimized owing to the relatively lightweight transport chain.

Weight-Sustaining Running Surface Elements

As has already been mentioned above, it is necessary, in particular also for varying the degree of stretching in the stretching zone, to implement different settings of the profile of the guide rail 15 and thus also of the profile of the support rail 17.

With regard to the adjustment of the guide rail, reference is made in this respect to known solutions. These are commonly composed of a single steel band or, in part, of a pack of flexible, continuously running spring steel bands, which, in cross section, are oriented vertically and arranged horizontally adjacent to one another. This yields an adjustment capability of the guide rail 15 transversely with respect to the vertically extending running surfaces 15*a* and 15*b* of the guide rail 15.

By means of joints of said type, it is possible for the profile of the guide path 2, in particular in the region of the stretching zone, to be set in accordance with the desired and optimum specifications.

Joint Construction of the Support and Compressed-Air Rail

In the following exemplary embodiment, the support rail 17 comprises a support rail construction or a support rail structure TS with one or more individual support rail sections or support rail chambers TSi, i=1 . . . n, which are charged with a preferably gaseous medium which is pressurized, such that the desired air cushion 130 can be generated in each case above said support rail by way of the mentioned outlet openings 122'.

Furthermore, in the following exemplary embodiment, the support rail 17 comprises a beam construction or beam structure TR with one or more beam sections or beam pieces TRi, i=1 . . . n, which are connected to the support rail sections TSi as discussed below.

The guide surface 17*a* (weight-sustaining running surface 17*a*) should, aside from the air outlet openings (air outlet openings 122') provided therein, be as far as possible of continuously closed form. A similar arrangement is also conceivable for the guide rail (in this construction, however, this is necessary only in the stretching zone).

Since the support and/or running rail 17 according to the invention is preferably equipped with an air bearing device in the form of a (compressed) air duct 122 which extends through the support and/or running rail 17 in the longitudinal direction thereof (as has already been discussed on the basis of FIG. 2), this also requires a specific joint construction.

Figure 6:
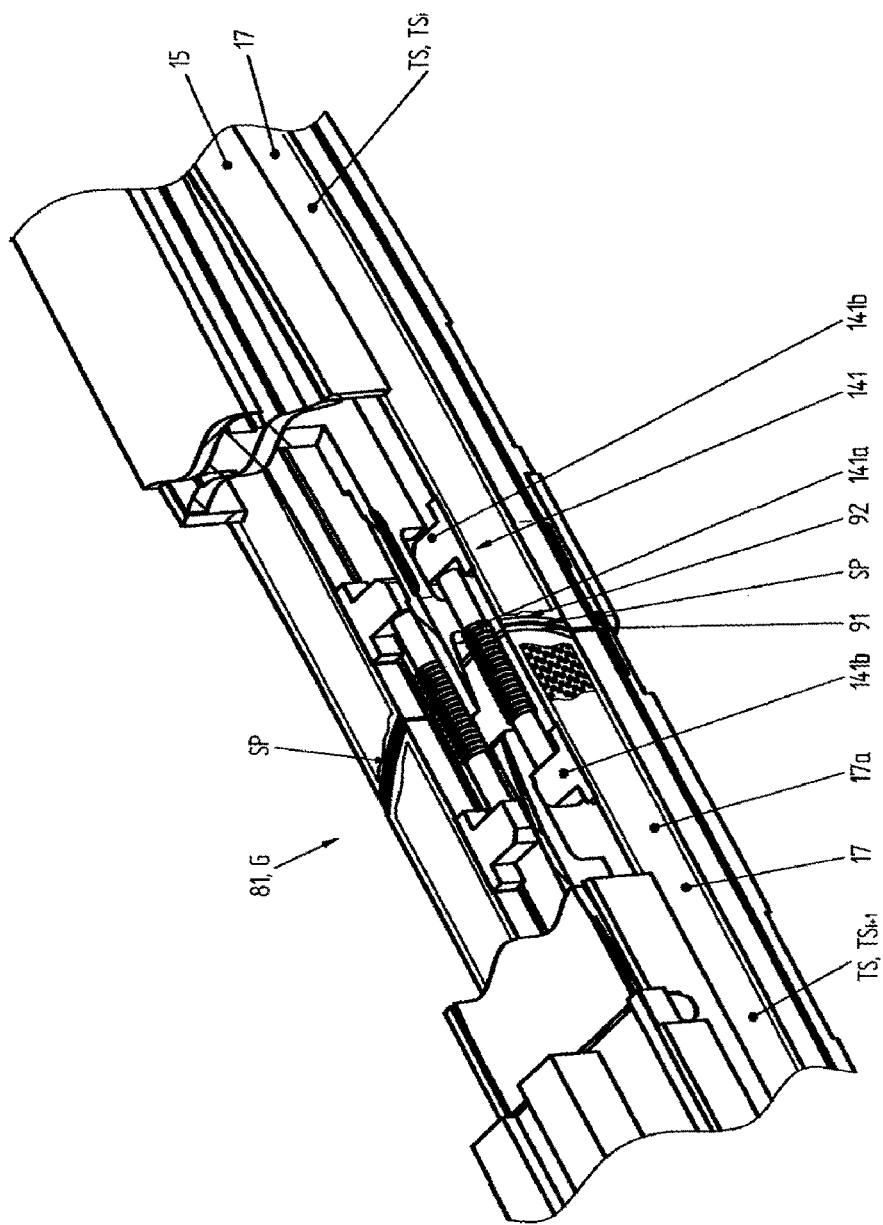
FIG. 6 to FIG. 8 are different illustrations showing the design of a joint in the beam structure and the support rail, with the formation of an exactly aligned rail transition.
Figure 7:
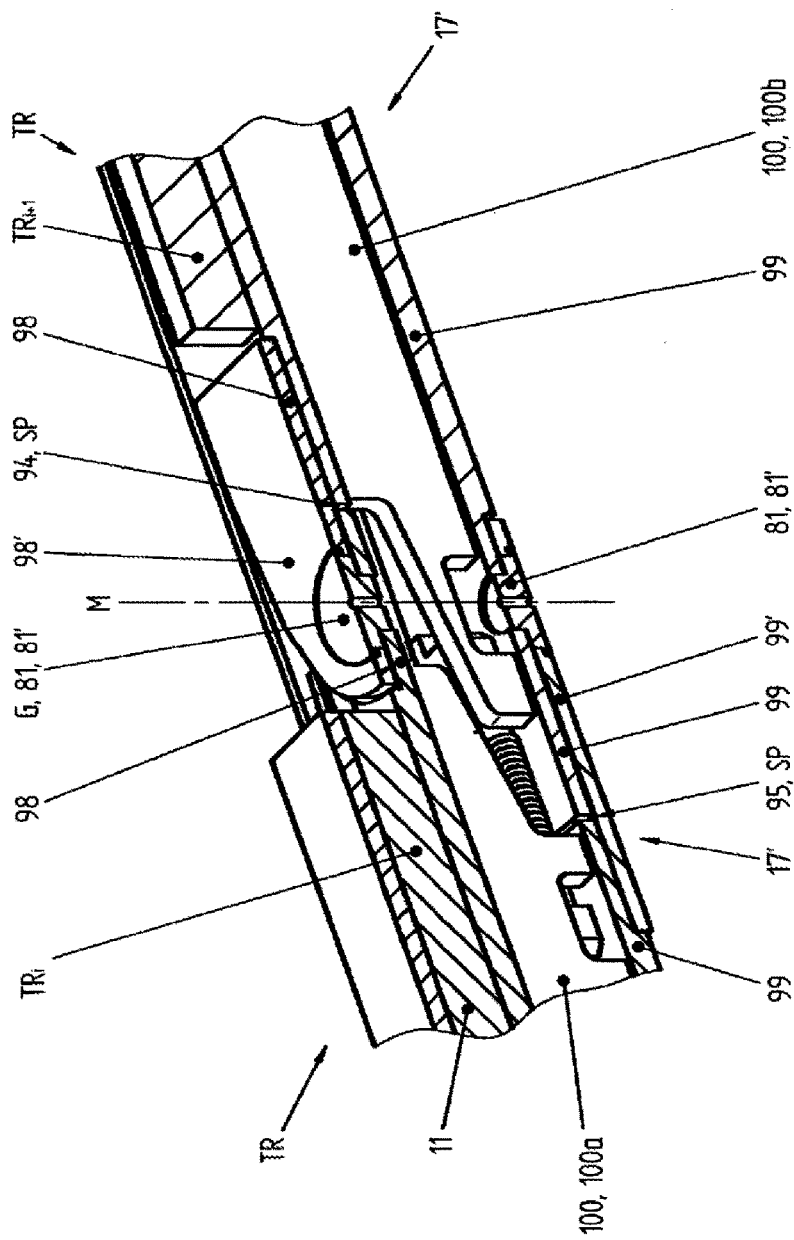
Figure 8:
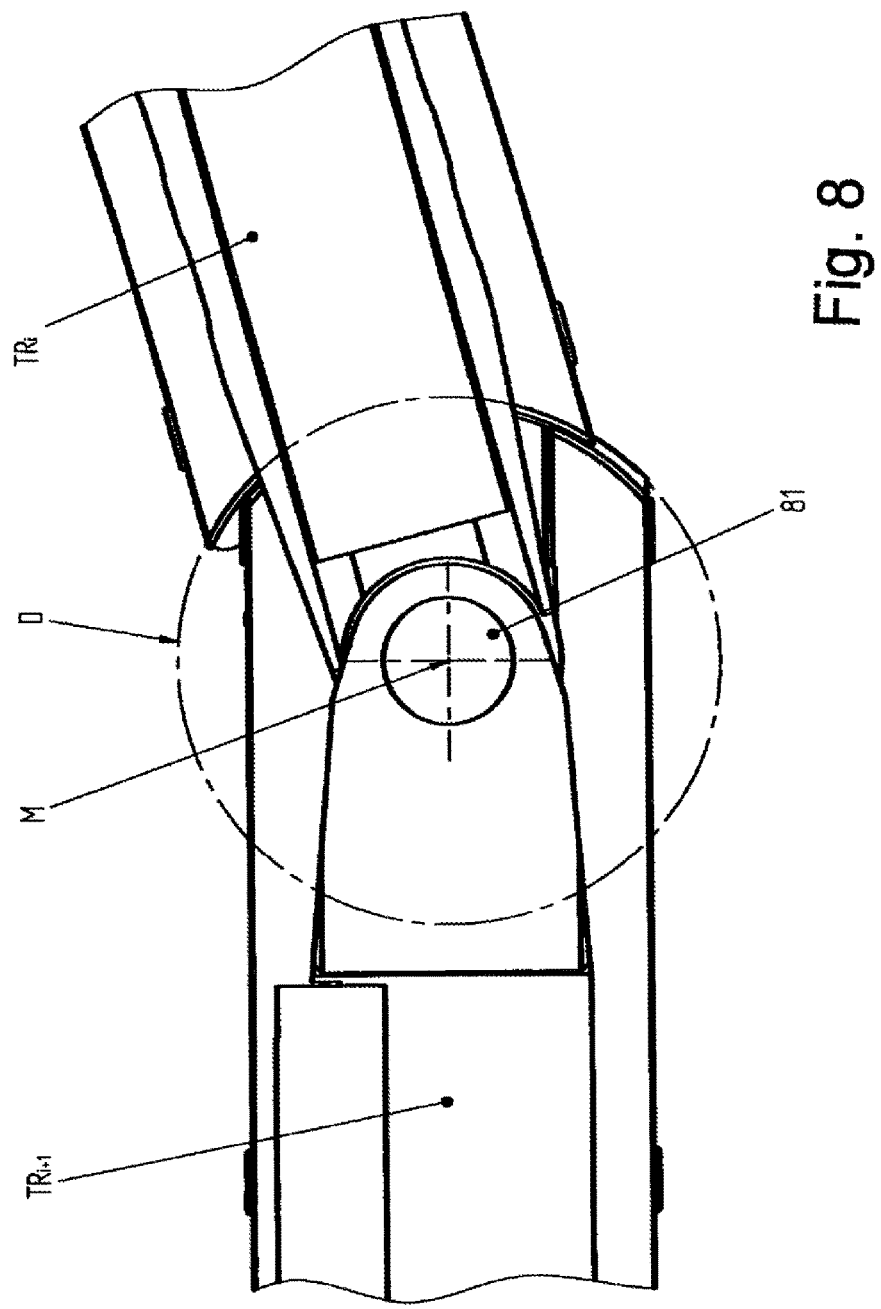

FIGS. 6, 7 and 8 illustrate a joint 81, also denoted by the reference sign G, for the two pieces or support rail sections or chambers TSi and TRi of the support and/or running rail 17, that is to say an articulated transition 81 between a first piece TSi and a subsequent piece TSi+1 of the support and/or running rail 17.

Firstly, it can be seen from said figures that the two pieces TSi, TSi+1 require complete separation from one another, for which reason consideration must be given to different sub-aspects which realize the separation.

Firstly, the separation of the support rail 17, in this respect also referred to as compressed-air rail 17, will be discussed. As stated, the top side or air outlet surface 17*a* of said support or running rail serves for the support of the air bearing cushion plates 140, which are attached to the underside of the clip chain units KK and which will hereinafter in part also be referred to as air bearing pads 140, and thus for the support of the weight forces FG, specifically during normal operation with the formation of the mentioned air cushion 130.

Owing to the mentioned separation of two adjacent pieces 170 in the support or running rail 17, there is firstly formed a parting gap SP which, as seen in plan view, forms a circular segment around a central joint axis M. The joint axis M is perpendicular to the support rail running surface 17*a*, and thus normally perpendicular to the plane of the film. The corresponding face sides of the two pieces of the guide rail are thus of concave form, on the one hand, and of convex form, on the other hand, correspondingly to the circular segment.

The gap width of the parting gap SP should be as small as possible. The pieces of the support rail 17 which adjoin one another along the gap are provided, in the region of the support rail surface 17*a*, with a run-off and a run-on chamfer 91, 92. Said chamfers 91, 92 are optimized such that the transition can take place without damage to the air bearing pads 140, that is to say to the cushion plate support surface 139 (hereinafter also referred to for short as pad running surface 139) on the pads 140, and without the action of moments.

It is also pointed out that the support rail pieces (TSi, TSi+) and the articulated connection G, 81, 81' provided in said region are formed so as to be bend-free and torsionally rigid so as to maintain a mutually aligned support rail running surface (17*a*).

It is furthermore provided that the support rail 17 or the support rail pieces TRi, TRi+1 are supported and held on the lower support parts 99 directly or with the interposition of spacers or insulating spacers 42.

Since, as mentioned, an air duct 122, that is to say an encircling air supply, is formed on the support rail 17, it is necessary for a separate connecting device 141 to be provided, by means of which the respective sections of the air duct 122 in the two pieces TSi and TSi+1 are connected to one another across the gap SP.

It can be seen in particular from the illustration in FIG. 6 that the two pieces TSi and TSi+1 of the support and/or air rail 17 are equipped, adjacent to the gap SP, with a transverse duct piece 141*a* by means of which a bypass line 141*b*, that is to say a bridging line 141*b*, is connected. In other words, the compressed air introduced into the air duct 122 in one piece TSi of the support rail 17 can then flow onward via a first transverse duct line 141*a* to the bypass line 141*b*, and via the bypass line 141*b* and the subsequent transverse duct 141*a* into the subsequent section of the air duct 122 of TSi+1 of the support rail 17. In this case, the face sides of the respective pieces of the support and/or running rail 17 adjacent to the gap SP are closed.

To ensure the mentioned seamless, exactly aligned transition between the two pieces 170 of the support rail 17, the beam structures (visible for example in FIG. 6), that is to say the successive beam structures TR with the pieces TRi and TRi+1, to which the support surface construction is fastened must be connected with corresponding rigidity with regard to torsion and bending moments. For this purpose, the FIGS. show the joint axis M and the parting joints 94 and 95 forming the parting gap SP in the beam parts.

To attain adequate torsional rigidity and thus also adequate resistance to bending moments, it is provided in the context of the invention that the beam plate joint sections 98' and 99', which belong to the beam structure TR and which run parallel to the support rail running surface 17a and which are thus offset vertically with respect to one another, overlap the associated beam construction 98 and 99 in parallel therewith. Here, it can be seen for example from FIGS. 6 and 7 that the in each case upper and lower support parts 98, 99 are fixedly connected to one another by way of in each case at least one reinforcement rib 100.

It is however furthermore also possible for further measures to be provided in order to yet further enhance or support the desired effects and advantages.

Embodiments of the Air Cushion and of the Associated Underside of the Clip Chain Units Owing to the joints in the concave and convex curved sections and the sprockets, a variable configuration of the air bearing cushions is necessary.

Below, a first corresponding exemplary embodiment will be discussed, from which an adjustment capability of the air bearing cushion plates 140 will become evident.

The air bearing cushion plates or air bearing pads 140 and thus the cushion plate support surfaces, that is to say the so-called pad running surfaces 139, are, in sections of the clip chain units KK of the encircling path 2 for the transport chain 13, divided into weight-sustaining running surface elements 140 which are displaceable or rotatable relative to one another, that is to say into so-called air bearing cushion plates or air bearing pads 140p, that is to say into corresponding individual elements 140p.

Figure 5A:
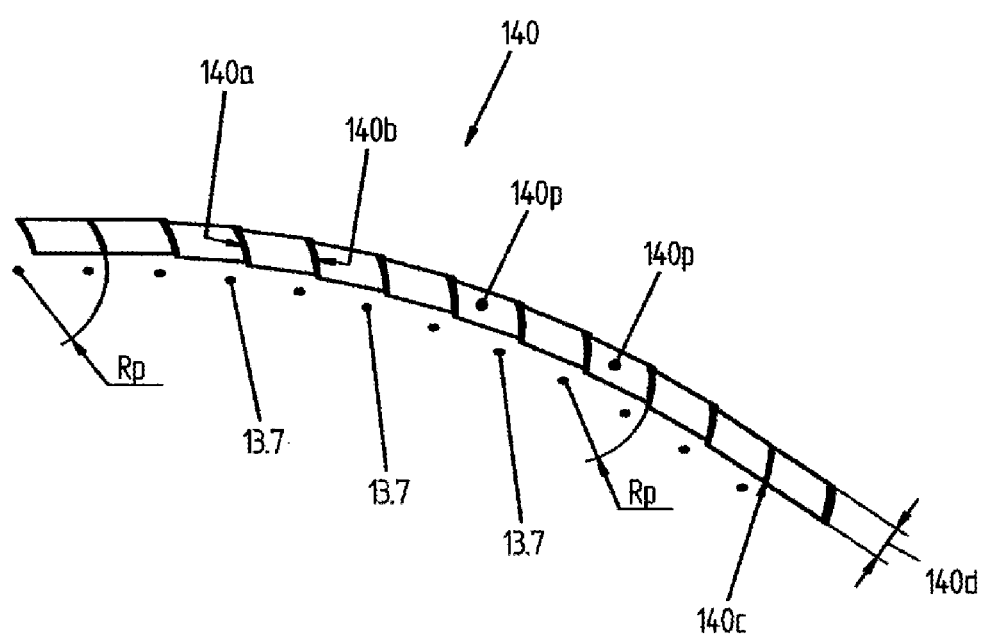
FIG. 5a shows a plan view of the profile of a guide path with support rail sections which can be adjusted relative to one another so as to form a convex arc.
Figure 5B:
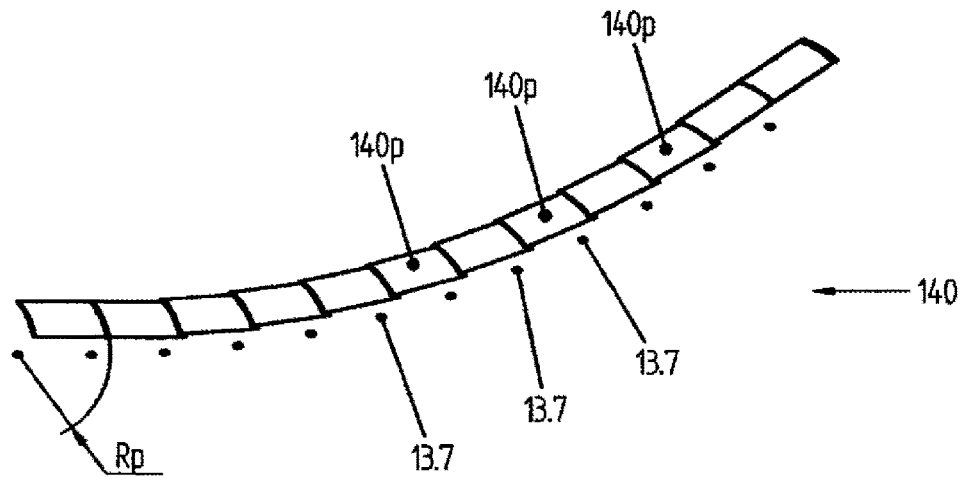
FIG. 5b is an illustration corresponding to FIG. 5a, in which, however, the individual support rail sections have been adjusted relative to one another in the opposite direction to FIG. 5a, so as to form a concave arc.
Figure 5C:
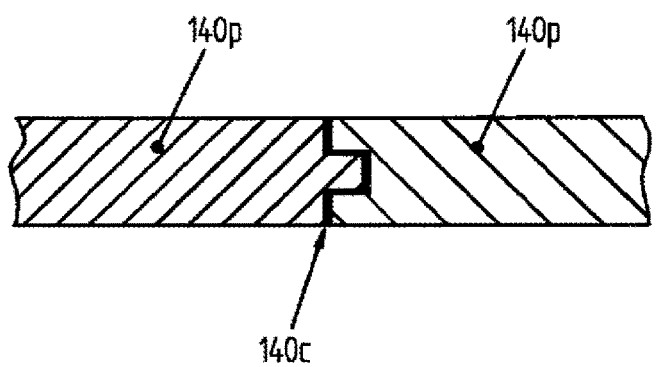
FIG. 5c is a schematic cross-sectional illustration through two adjacent rail sections, with the formation of a connection of the two adjacent support rail sections.

If the individual delimiting surfaces 140a, 140b, formed in a leading and in a trailing direction of the air bearing pads 140p, are of circular segment-shaped form in plan view with a radius Rp, this makes it possible, for example, for in each case two successive air bearing element sections 140, which are charged with air and which are formed in the manner of air bearing pads 140p, to be displaced laterally relative to one another and, in the process, rotated slightly, whereby, for example, a straight path section can be made into a curved path section, as can be seen in a schematic plan view in FIGS. 5a and 5b for convex and concave curve sections.

Here, furthermore, the chain pins 13.7 are also indicated in FIGS. 5a and 5b in order to show, by way of example, the direction in which the adjustment can be performed (that is to say basically in both directions, as can be seen from the views as per FIGS. 5a and 5b).

The two abutment or delimiting surfaces 140a, 140b, which are of circular segment-shaped form in plan view, of two adjacent or successive air bearing pads 140p thus ultimately form, between them, a parting joint or a parting gap 140c, which may be arbitrarily small and tends to zero because the delimiting or abutment surfaces 140a, 140b make contact, and are mounted in sliding fashion relative to one another, over the full area. In other words, therefore, the parting joints 140c or the parting gaps 140c of the air bearing pads 140p are manufactured so as to be as small as possible, in order to thereby also keep the leakage flows as small as possible. Here, the parting gaps 140c should be smaller than 2 mm, in particular smaller than 1.5 mm, 1 mm, 0.75 mm, 0.5 mm and in particular smaller than 0.25 mm. It is self-evidently also possible for the parting joint 140c of two adjacent pads to be formed with a meandering connection, that is to say with a tongue-and-groove connection, as depicted by way of example in FIG. 5c. This ultimately yields a closed slide surface 139, that is to say a cushion plate support surface (pad running surface) 139 which is closed to a greater or lesser extent and which additionally prevents air, which emerges via the flow duct 122 and the outlet openings 122' provided therein, from being able to flow out unhindered through the mentioned parting joint or parting gaps 140c.

The air cushion widths 140d, that is to say the width dimensions 140d of the air bearing pads 140p, are basically configured such that there is broad overlap of the air cushion support surface 139 over the width of the top duct wall 122a, which is equipped with outlet openings 122' and a corresponding perforation 122", of the flow duct 122, specifically in particular also in the region of the joints G and of the sprockets in the run-in and run-out zones.

It is also possible (as indicated for example in FIG. 4a) for the air outlet openings to be provided only in an air outlet region 122b with an air outlet width 122c which is fundamentally narrower than the overall width of the support rail running surface 17a. It is essential that the widths of the air cushion support surfaces 139 are at least greater than the running outlet width 122c of the support rail 17. In other words, the air cushion width 140d of the air cushion pads 140p (that is to say of the air bearing cushion plates 140) should be greater, by at least 10%, preferably by more than 20%, 30%, 40% or more than 50%, than the air outlet width 122c or the width of the support rail running surface 17a (FIG. 4a).

Encircling Air Bearing, also at the Sprockets

The support rail 17 and/or the cushion plate support surface 139, that is to say in particular also the corresponding pad running surface 139 on the individual air bearing pads 140p, remains continuous even in the region of the sprockets 51. In this way, by contrast to the prior art, no slide pieces are required for lift compensation. The air bearing arrangement with the air bearing cushion plates 140 and the individual air bearing cushions or pads 140p thus form a convex, circular segment-shaped form by way of the beam structure, which is porous and/or equipped with air outlet openings.

The guide rail 15 is not required in the region of the sprockets. The run-out and run-in areas are however implemented, in terms of construction, with positive tangential synchronization.

Figure 10:
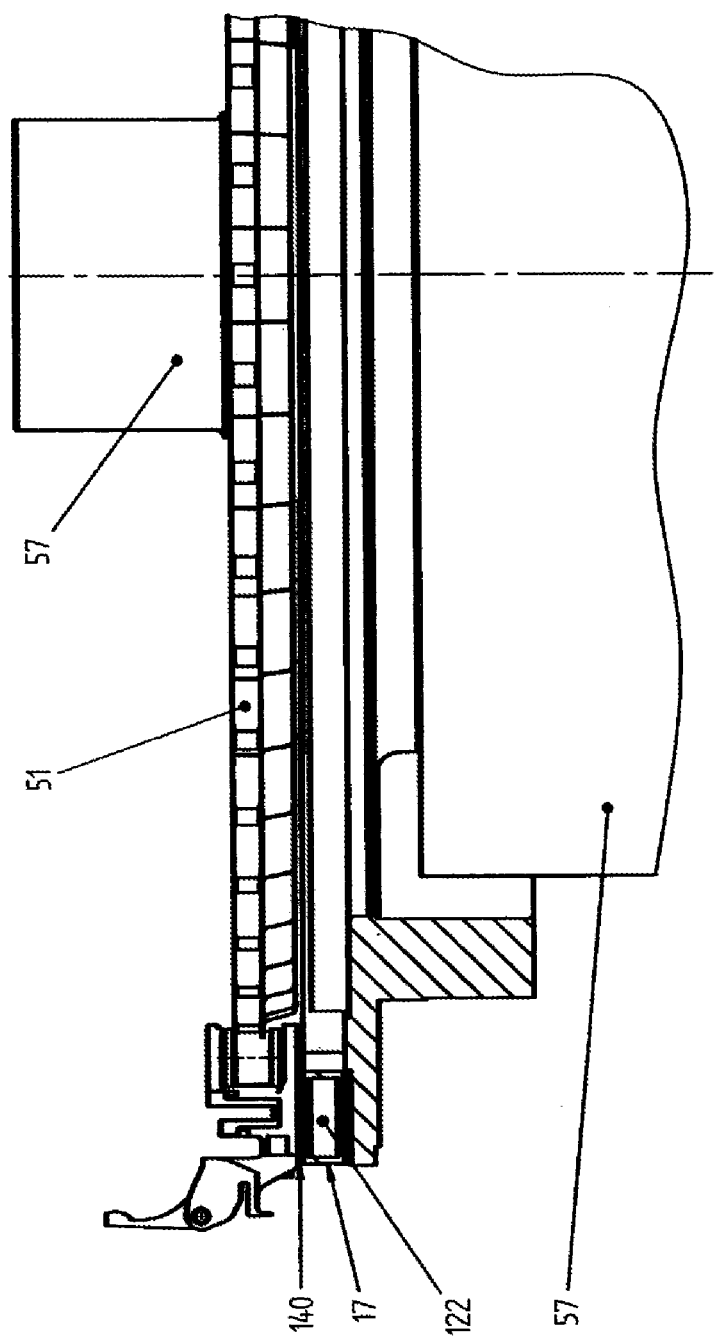
FIG. 10 is a further detail illustration of the support rail and of a clip chain unit, which is guided along the support rail, as said clip chain unit runs onto a sprocket.

Finally, for the sake of completeness, it should also be mentioned that the mentioned sprockets 51 at the run-out area and/or at the run-in area are preferably configured such that the sprockets 51 directly interact with, and are driven by, a solid-shaft motor 57, such as can be clearly seen for example in the side-on illustration or cross-sectional illustration in FIG. 10.

Additional Decoupling of the Forces

Furthermore, in the context of the invention, it may furthermore be provided that, by contrast to the prior art, ideally complete, that is to say 100%, decoupling of the vertical and horizontal forces is additionally realized in the transport system according to the invention. In conjunction with the weight and center of gravity distribution of a lightweight construction of the clip chain units KK and thus of the transport chain as a whole, it is furthermore possible to realize a further optimization of the transport chain and of the transport system. This leads to a considerable energy saving and to an increase in transportation speed and increased film production.

Figure 9:
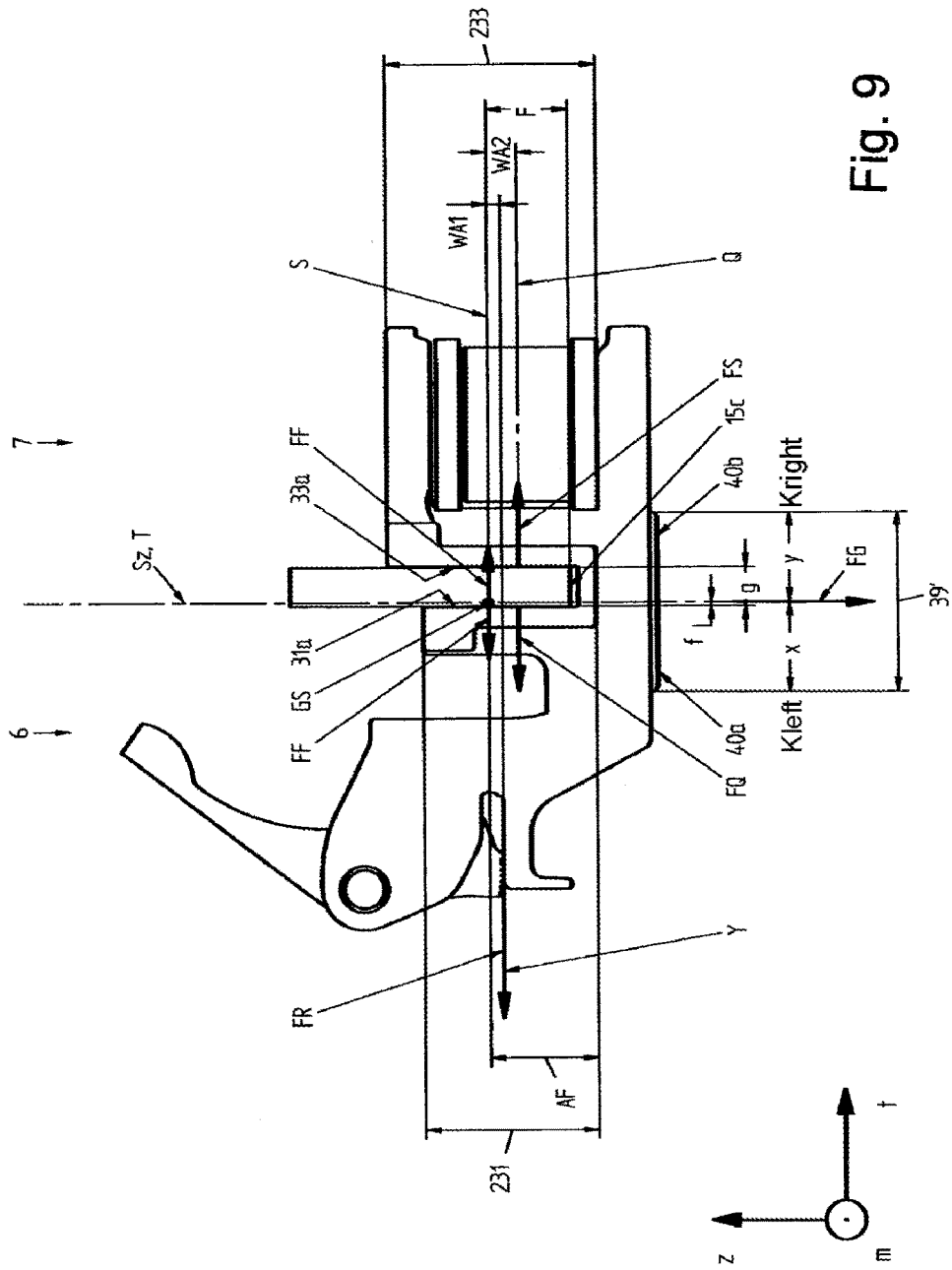
FIG. 9 shows a schematic side view of the clip chain unit, shown in FIGS. 2 to 4b, with the forces acting thereon and effective planes in which said forces arise and act.

In the context of a refinement of the invention, it is sought, for this purpose, for at least the weight of the clip parts 6 and of the transport parts 7 to be distributed in balanced fashion symmetrically with respect to a virtual plane of weight symmetry Sz (FIG. 9, wherein, in FIG. 9, m denotes a coordinate along the guide rail 15, t denotes a coordinate perpendicular to the guide rail 15, and z denotes the vector normal to m and t, such that the plane formed by the coordinates m-z forms the plane of weight symmetry Sz running through the center of gravity GS). In the case of the transport chain-driven clips, this means that, here, there should be a balanced weight distribution between the clip bodies, that is to say the clip parts 6, and the transport parts 7.

The respective clip part 6 and the chain part 7 connected thereto should thus be more or less balanced in terms of weight.

In other words, therefore, the weight (which determines the overall weight of the clip body) of the clip part 6 and the weight of the chain or transport part 7 is distributed symmetrically with respect to the virtual plane of weight symmetry Sz and thus as uniformly as possible with respect to the weight-sustaining running surface 39, wherein the virtual plane of weight symmetry Sz runs through the center of gravity GS and, in so doing, parallel to the running surfaces 31, 33 of the slide shoe 29a. In this way, it is sought to ensure that, firstly, no tilting or twisting moments are generated by an asymmetrical weight distribution of the transport chain 13 and/or of the clip chain units KK, and that, secondly, the contact pressure on the cushion plate support surface 139 is distributed as symmetrically as possible with respect to the axis of weight symmetry or plane of weight symmetry Sz, in order to minimize air consumption and optimize the functionality of the air bearing 130. Thus, by means of the overall arrangement, it is ensured or at least substantially ensured that, as mentioned, the transport chain and the clip body are not acted on by tilting moments or torques, which would otherwise lead to high air consumption and possibly to contact between the air bearing pads 140 or 140p and the air outlet openings 122' in the support rail 17.

Here, FIG. 9 shows the center of gravity GS of the clip chain unit KK for a transport chain-driven transverse stretching installation, which in the exemplary embodiment shown comes to lie in the region of the guide rail slide body 29, that is to say in the central region thereof. It is here that the weight force FG acts, the vector of which is plotted in FIG. 9. Said weight force vector FG lies in this case in a virtual plane of weight symmetry Sz, the m-z plane through the center of gravity GS, which runs perpendicular to the plane of the drawing. The weight force vector FG or the virtual plane of weight symmetry Sz runs in this case centrally and symmetrically with respect to the air bearing cushion plate 140 provided on the underside 25f of the clip mechanism 25, and in so doing perpendicularly intersects the pad running surface 139 and/or the support rail running surface 17a.

Furthermore, the center of gravity plane Sz is arranged parallel to the m-z plane within the thickness of the guide rail 15, wherein, in FIG. 9, f denotes the horizontal spacing between the vertically running center of gravity plane Sz and the vertically running chain force-sustaining running surface 31a, and g denotes the horizontal spacing to the vertically running stretching force-sustaining running surface 33a, that is to say the values f and g are ≥0. The slide elements of the weight force-sustaining guide are situated far outside this center of gravity plane, such that no tilting moments can arise. The slide element system is furthermore optimized such that identical or virtually identical contact pressures symmetrically with respect to the center of gravity plane Sz are attained either by way of the spacings x, y (FIG. 9) or by way of different surface sizes.

The maximum width extent 39' of the air bearing pads 140p, 140 is indicated for example in FIG. 9. Said maximum width extent corresponds to the sum of the values x+y, wherein x constitutes the spacing between the vertical center of gravity plane Sz and the furthest remote point 40a' of the air bearing pad 140p, 140 on the clip side and the distance y constitutes the spacing from the center of gravity plane Sz to the furthest remote point 40b' of the air bearing pad 140p, 140 on the chain side. Here, the center of gravity plane Sz should preferably extend centrally through the maximum width extent 39' (=x+y). If the center of gravity plane Sz extends through said maximum width extent eccentrically with respect to the air bearing pads 140p, 140, such that the lateral spacing x differs from the lateral spacing y, then the air bearing pads 140p, 140 should be dimensioned in terms of width such that the contact pressures are identical with respect to the center of gravity plane Sz. In other words, the (equal) component weight forces Kleft and Kright which act at the furthest remote points 40a' and 40b' (see FIG. 9) should thus run, with respect to the center of gravity plane Sz, such that the spacing x differs from the spacing y; thus, in this case, too, it should be ensured that the contact pressures to the left and to the right of the center of gravity plane Sz are equal, which has the result that the clip chain unit KK does not tilt.

All further forces acting on the transport chain, on the individual links thereof and/or on the clip chain units KK thereof are, owing to the construction principle selected in the context of the invention, oriented perpendicular to the weight force FG. Here, however, not only are said further forces oriented perpendicular to the weight force FG, they also act on the respective clip chain units KK, and thus on the transport chain, more or less at the same or approximately the same height, whereby it is ensured that said transverse forces do not introduce any additional tilting moment or torque into the clip body and thus into the transport chain, such that, here, too, said transverse forces do not contribute to an increase in friction action.

The center of gravity plane Sz in the embodiment of a transverse stretching installation shown in FIG. 9, which uses a transport chain, is furthermore situated within the width of the guide rail 15. Said center of gravity plane Sz may however likewise also be arranged so as to run outside the guide rail 15, specifically if the center of gravity lies outside the guide rail 15.

It is advantageous here if the center of gravity plane Sz running through the center of gravity FG intersects the corresponding support surface 17a and the maximum width extent 39' of the air bearing pads 140p, 140, such that, here, a torque-free and tilt-free, balanced arrangement is provided. The stretching force FR acts in the stretching force plane (m-t plane through the film layer). The centrifugal forces FF act in the horizontal centrifugal force plane S (m-t plane through GS) which runs through the center of gravity GS. The chain longitudinal forces FKi give rise, depending on curve section, to a transverse force FQ and a lateral guidance force FS, which act on the Q plane.

All further forces acting on the transport chain 13, that is to say on the individual links thereof such as the clip parts 6 and the chain parts 7, are, owing to the construction principle selected in the context of the invention, oriented perpendicular to the weight force FG. Here, however, not only are said further forces oriented perpendicular to the weight force FG, they also act on the respective clip body, and thus on the transport chain, more or less at the same or approximately the same height, whereby it is ensured that said transverse forces do not introduce any additional tilting moment or torque into the clip body and thus into the transport chain, such that, here, too, said transverse forces do not contribute to an increase in friction action.

Here, as can be seen from the drawings, the height of the chain force-sustaining running surface 31a and the height of the stretching force-sustaining running surface 33a may by all means differ. It is essential merely that the stretching, transverse, lateral surface and/or centrifugal forces acting thereon perpendicular to the weight forces FG act in the region of the chain force-sustaining running surface 31a and of the stretching force-sustaining running surface 33a and, in this case, in particular, the associated vectors act in a common plane or in planes lying close to one another, such that tilting moments or torques which otherwise occur, and which could act on the clip body 6 and thus on the transport chain 13, are prevented or minimized to the greatest possible extent.

Therefore, the drawings also show a chain force-sustaining running surface height 231 and a stretching force-sustaining running surface height 233 (for example FIG. 9), which describe the respective height or effective height from the lowermost to the uppermost point of the respective slide surface 31a or 33a (said slide surface need not be continuous from the lowermost to the uppermost point but may have slide surfaces formed so as to be spaced apart from one another, so as to form a free intermediate space). What is essential is merely the effective overall height of the respective chain force-sustaining and/or stretching force-sustaining running surface height 231 and 233, respectively, which is supported on, that is to say interacts with, the corresponding running or outer surface 15a, 15b of the guide rail 15. It is specifically in this region that, with the exception of the weight force FB, all of the further occurring forces running perpendicular to said weight force are intended to act, such that here, it is likewise the case that no tilting moments and torques can be introduced at the guide rail. In other words, it is the intention that all of the forces, which in this case act perpendicularly on the guide surfaces and slide surfaces, are supported in tilt-free and torque-free fashion on the guide rail, as well as the weight force FG, which acts perpendicular thereto and is intended to be supported in tilt-free and torque-free fashion on the support and weight-sustaining rail 17, by virtue of said weight vector, too, intersecting the corresponding running surface 17a of the support rail 17 in the region of the effective slide surface formed there.

Here, the discussed transport system is characterized inter alia also in that the clip chain unit KK is designed such that
the centrifugal force plane S runs parallel, and with a gravitational force effective spacing WA1, to the stretching force plane Y,
the transverse force or lateral guidance force plane Q runs parallel, and with a force effective spacing WA2, to the stretching force plane Y, and
a spacing AF provided between the gravitational force plane S and the lower edge 15c of the guide rail 15 is at least twice as large, and preferably at least three times, four times or at least five times as large, as the greatest of the two effective spacings WA1 or WA2.

It is however likewise also possible for the transport system to be designed such that the clip chain unit KK and the guide rail 15 are designed such that
the centrifugal force plane S and/or the transverse force or lateral guidance force plane Q coincide with the stretching force plane Y, and
a spacing AF between the centrifugal force plane S and the lower edge 15c of the guide rail 15 is dimensioned with a size of at least 1 mm, preferably at least 5 mm, 10 mm, 20 mm, 30 mm, 40 mm, 50 mm or more.

Finally, it is pointed out that the mounting, discussed with regard to the support rail 17, of the clip chain units KK by means of an air cushion 130 may basically be provided in supplementary fashion, that is to say additionally, or alternatively in the context of the guide rail too. This is because it is likewise possible for the guide rail 15 to be formed with a rectangular housing wall forming an internal and longitudinally running duct 122 via which compressed air is supplied. As shown in FIG. 11, it is possible for this purpose for air outlet openings 122', 122" to be formed for example on the running or outlet surfaces 15a, 15b on the guide rail 15, such that here, in each case, a possibly thin air cushion 130 is formed, specifically relative to the respective slide surface 31a or 33a on the slide bearing arrangement 29, for example in the form of the so-called slide shoe 29a, by means of which air cushion the clip chain unit KK is then mounted on the guide rail 15. In this case, the slide bearing arrangement 29 may, in terms of configuration, size and/or material selection or composition, be configured in exactly the same way as has basically been discussed with regard to the cushion plates 140, that is to say the so-called air bearing pads 140p. The statements made in this context likewise also apply to the design of the bearing arrangements 29. Where reference is made, in the context of the bearing pads, to the running outlet width 122c of the support rail 17 or the width of the support rail or of the support rail running surface 17a itself or the width of the cushion plates 140, that is to say of the air bearing pads 140p, it is, in the case of the guide rail, the air outlet width in the vertical height direction of the guide rail 15 that is of importance, as well as the height, running in a vertical direction, of the slide elements 31 and 33 interacting with said guide rail.

Here, it may also be provided that in the case of the support rail and also in the case of the guide rail, the corresponding air bearing arrangement is provided only over partial distances. For the guide rail in particular, it is for example expedient for an air bearing arrangement to be provided only in the stretching zone itself.

In other words, the system according to the invention may be formed, so as to form one or more air cushions, on a monorail, that is to say on a single rail, which serves as a support and guide rail. The system according to the invention may however also be configured with a two-part rail arrangement, for example using a guide rail 15 and using a support rail 17 which, in particular, accommodates the weight of the transport chain, wherein, in this case, a corresponding air cushion 130 can be generated for example by way of the support rail 17, and/or for example preferably two air cushions 130 can be generated in the region of the guide rail in interaction with the two slide surfaces 31a, 33a of the clip chain unit KK. In other words, such air systems can be formed either in the case of the support rail 17 or in the case of the guide rail 15 or, in the case of such separate rail arrangements, both in the case of the support rail 17 and in the case of the guide rail 15. There are no limitations and variations in this respect.

Description of the Composite Materials, in Particular of the Fiber Composite Materials In all of these exemplary embodiments, however, the clip transport units KT, that is to say the clip part itself and/or the transport part itself, may be improved, on the basis of the exemplary embodiments already described in the introduction, by virtue of the corresponding parts being composed of or comprising composite materials, in particular long-fiber composite materials, in a volumetric fraction of more than 25%, in particular more than 30%, 40%, 50%, 60%, 70%, 80% or even more than 90%, on their own or in combination with further materials.

What experts understand under the term "composite materials" can be gathered for example from Wikipedia (https://de.wikipedia.org). According thereto, composite materials are to be understood to mean all material combinations of two or more materials. Normally, a composite material is composed of a so-called matrix into which one or more other materials, so-called property components, are embedded. Here, the components of a composite material may themselves be composite materials. The composite material exhibits better material properties than its individual components. Possible examples are particle composite materials, fiber composite materials, such as a glass fiber-reinforced matrix, metal matrix composites (MMC), preferably long-fiber, carbon fiber-reinforced matrices, self-reinforced thermoplastics, aramid fiber-reinforced plastic (AFP), fiber-ceramic composites (ceramic matrix composites (CMC)), layered composite materials; TiGr composites, fiber-reinforced aluminum, sandwich constructions, bimetals, Hylite, a sandwich structure composed of a plastics panel embedded between two aluminum panels/foils, and ceramic-fiber composite materials.

Composite materials are thus fundamentally multi-fiber or mixed materials. Here, a fiber composite material is composed generally of two main components, specifically an embedding matrix and reinforcing fibers.

The substance-based division of the materials into polymers (plastics), metallic, ceramic and organic materials gives rise to the basic combination possibilities for composite materials. Here, it is sought, on an application-specific basis, to combine the different advantages of the individual materials, and eliminate the disadvantages, in the final material.

The matrix, and also the property components, may be composed of metals such as for example aluminum, magnesium etc., of polymers (thermosets), resins such as polyester resin, polyurethane resin (polyurethanes), epoxy resin, silicone resin, vinyl ester resin, phenol resin, acrylic resin (PMMA) etc., or of combinations of these.

Use is preferably made of fiber composite materials, in particular long-fiber fiber composite materials. It is however basically also possible to use particle composite materials, layered composite materials, impregnated composite materials, and structural composite materials. The fibers may run in one or more particular directions, or have preferential directions. Fiber composite materials may be produced in layered fashion.

As is known, the matrix determines the appearance of the composite material, and in particular the fiber composite material. Here, said matrix also serves to hold the reinforcing fibers in their position and accommodate and distribute the corresponding forces and stresses. At the same time, the matrix protects the fibers against external influences, in particular also mechanical and chemical influences.

The fibers provide the fiber composite material with the required strength, including the required tensile strength and/or flexural strength.

As a matrix, use is made, for example, of lightweight materials, inter alia aluminum or magnesium. It is however also possible for other metals to be used as a matrix. It is likewise possible for various ceramics to be used as a matrix for corresponding composite materials, that is to say in particular fiber composite materials. Finally, in this connection, it should also be mentioned that carbon and carbon fiber-reinforced carbon (CFC) may be used.

Otherwise, for fiber composite materials, use is preferably made of fiber-plastics composite materials, in which, as matrix, use is made of polymers, specifically for example

- duromers (thermosets, plastics resin etc.)
- elastomers
- thermoplastics.

The connection of the composite materials (matrix and property component) is performed using the conventional methods, such as injection molding, insert techniques, vacuum casting etc. The hardening and compaction of the composite (for example prepregs) is performed in a vacuum and autoclaves using the conventional methods, for example prepreg or RTM (resin transfer molding) methods.

The invention claimed is:

1. A transport system for a stretching installation comprising:
    at least one guide path,
    a transport chain is arranged so as to circulate on said guide path,
    the guide path comprising a guide rail,
    the transport chain comprising a multiplicity of chain link units that are articulatedly connected to one another,
    a plurality of clip chain units that are each divided into a clip part and into a chain part comprising a chain link, and
    a support rail which accommodates a weight force of the plurality of clip chain units,
    wherein:
    the support rail or the guide rail, or the support rail and the guide rail, is or are equipped with a duct which extends through the support rail and/or the guide rail in a longitudinal direction at least in one length segment,
    a support rail running surface comprises a multiplicity of outlet openings formed therein, through which outlet openings compressed air can be supplied via the duct so as to generate an air cushion between the support rail running surface and an air bearing cushion plate on the clip chain unit, and/or
    a guide rail running surface comprises a multiplicity of outlet openings formed therein, through which outlet openings compressed air can be supplied via the duct so as to generate an air cushion between the respective guide rail running surface and a bearing device on the clip chain unit.

2. The transport system as claimed in claim 1, wherein the outlet openings of the support rail running surface and/or the guide rail running surface have a diameter dimension smaller than 1 mm.

3. The transport system as claimed in claim 1, wherein the outlet openings of the support rail running surface and/or the guide rail running surface comprise a perforation or are configured in the form of a porous support rail running surface.

4. The transport system as claimed in claim 1 wherein
a) the air bearing cushion plates have a width, perpendicular to a feed direction, which is greater than a width of the support rail or greater than a width of at least one of the air outlets within which the air outlet openings in the support rail running surface are formed, or
b) a slide bearing arrangement assigned to the guide rail running surface has a height dimension, perpendicular to the feed direction, which is greater than the width of at least one of the air outlets in the guide rail, wherein the air outlet openings are provided within the width of at least one of the air outlets.

5. The transport system as claimed in claim 1, wherein the support rail is equipped with articulated connections, wherein, upstream and downstream of an articulated connection in a feed direction, there are formed support rail pieces which can be set into different angular positions relative to one another, and wherein the support rail is rendered discontinuous, in the region of the articulated connection, by a parting gap, wherein two discontinuous pieces of the duct are connected to one another by way of a bypass line.

6. The transport system as claimed in claim 5, wherein the support rail running surface is, in the region of the articulated connection, arranged at the same level, that is to say in mutual alignment, across the parting gaps provided in said region, wherein, in the region of the parting gap, run-on and run-off chamfers are formed on the support rail pieces that adjoin one another there.

7. The transport system as claimed in claim 5, wherein the support rail pieces and the articulated connection provided in said region are configured to be bend-free and torsionally rigid so as to maintain a mutually aligned support rail running surface.

8. The transport system as claimed in claim 5, wherein the support rail or the support rail pieces comprise(s), upstream or downstream of the articulated connection, a beam structure with support rail pieces, specifically with a lower support part and with an upper support part spaced apart from said lower support part, wherein the in each case lower and upper support parts are fixedly connected to one another by way of in each case at least one reinforcement rib.

9. The transport system as claimed in claim 8, wherein, on at least one lower and one upper support part, there is formed in each case one plate-shaped support plate joint section in which a joint disk is arranged which extends through a corresponding bore in a region of overlap with the adjoining leading or trailing beam part.

10. The transport system as claimed in claim 8, wherein the support rail and/or the support rail pieces are supported and held on the lower support parts directly or with the interposition of spacers or insulating spacers.

11. The transport system as claimed in claim 1, wherein the clip part and/or the chain part are/is composed of or comprise(s) one or more composite materials, in a volumetric or weight fraction of more than 25%.

12. The transport system as claimed in claim 10, wherein the clip part and/or the chain part comprises at least one composite material with at least one matrix material and with at least one functional or property component, wherein
a) the at least one matrix component comprises one or more of the materials aluminum, magnesium, ceramic, carbon, duromers, elastomers and/or thermoplastics, and
b) the property or functional component comprises or is composed of one or more of the materials glass fibers, carbon fibers, ceramic fibers, aramid fibers, boron fibers, steel fibers and/or nylon fibers.

13. The transport system as claimed in claim 1, wherein the transport chain is guided around at least a part of the circumference of at least one sprocket, and wherein the support rail with the duct for forming an air cushion is also formed in this region.

14. The transport system as claimed in claim 1, wherein, on the underside of the clip chain units, there are provided air bearing cushion plates, between which and the running surface of the support rail the air cushion is formed, wherein in each case two successive air bearing cushion plates of two successive clip chain units have a convex and concave delimiting surface, respectively, which delimiting surfaces engage into one another, whereby two successive clip chain units, with the air bearing cushion plates assigned thereto, can be set at an angle with respect to one another.

15. The transport system as claimed in claim 14, wherein the convex delimiting surface which engages into the concave delimiting surface of a directly adjacent air bearing cushion plate is configured such that a virtual central point and/or axis of rotation of the convex delimiting surfaces lie offset with respect to the running surface of the support rail.

16. The transport system as claimed in claim 14, wherein, between two delimiting surfaces of two adjacent or successive air bearing cushion plates, there is formed a parting gap which is smaller than 2 mm.

17. The transport system as claimed in claim 1, wherein the bearing device formed on the underside of the clip chain unit is in the form of a closed or substantially closed pad running surface which fully covers the outlet openings.

18. The transport system as claimed in claim 1, wherein the clip chain units are equipped, on their guide and support surface situated facing the running surface of the support rail and/or the running surface of the guide rail, with a slide bearing arrangement, which slide bearing arrangements, even in the event of failure of an air cushion, permit low-friction sliding on the running surface of the support rail and/or on the running surface of the guide rail.

19. The transport system as claimed in claim 18, wherein the slide bearing arrangements comprise or are composed of thermoplastics or thermosets, which include carbon and/or glass fibers, solid lubricants, and/or are coated with low-friction plastics and/or are produced by means of mechanical surface treatment and/or by radiation and by thermal or electrical surface treatment.

20. The transport system as claimed in claim 1, wherein stretching forces, which act on the clip chain unit in a stretching force plane, and centrifugal forces, which run through the center of gravity of the clip chain unit and act in a centrifugal force plane, and lateral guiding forces and transverse forces, which act in a transverse force plane, run at an angle of 90°±less than 5°, with respect to the weight force which acts at a center of gravity of the clip chain unit.

21. The transport system as claimed in claim 20, characterized by the following further features:
the clip chain units comprise at least one stretching force-sustaining running surface, oriented toward the stretching side, and a chain force-sustaining running surface pointing in an opposite direction to said stretching force-sustaining running surface, which stretching force-sustaining running surface and chain force-sustaining running surface are oriented parallel to one another and so as to point toward one another, whereby the clip chain unit is guided so as to be displaceable along the guide rail by way of the chain force-sustaining running surface and the stretching force-sustaining running surface which is oriented parallel to and in the opposite direction to said chain force-sustaining running surface, wherein the chain force-sustaining running surface, in the range of its chain force-sustaining running surface height, and the stretching force-sustaining running surface, in the range of its stretching force-sustaining running surface height, are supported on the guide rail, and on the underside of the clip chain unit, there is or are provided one or more slide elements with a support surface arrangement for the support of the clip chain unit with respect to the running surface of the support rail, wherein the center of gravity plane running through the center of gravity of the clip chain unit intersects the support surface arrangement, in relation to its maximum width extent, perpendicular to a feed direction and the support rail running surface.

22. The transport system as claimed in claim 20, wherein the stretching force plane, the centrifugal force plane and the transverse force or lateral guidance force plane intersect the guide rail in a region in which the clip chain unit is supported on the guide rail.

23. The transport system as claimed in claim 20, wherein the clip chain unit is configured such that the centrifugal force plane runs parallel, and with a gravitational force effective spacing, to the stretching force plane, the transverse force or lateral guidance force plane runs parallel, and with a force effective spacing, to the stretching force plane, and a spacing provided between the centrifugal force plane and the lower edge of the guide rail is at least twice as large as the greatest of the two effective spacings.

24. The transport system as claimed in claim 20, wherein the clip chain unit and the guide rail are configured such that the centrifugal force plane and/or the transverse force or lateral guidance force plane coincide with the stretching force plane, and a spacing between the gravitational force plane and the lower edge of the guide rail is dimensioned with a size of at least 1 mm.

25. The transport system as claimed in claim 21, wherein a projection of the chain force-sustaining running surface and a projection of the stretching force-sustaining running surface intersect the air bearing cushion plate.

* * * * *